(12) United States Patent
Funatsu

(10) Patent No.: US 12,244,928 B2
(45) Date of Patent: Mar. 4, 2025

(54) ELECTRONIC APPARATUS CAPABLE OF TRACKING OBJECT, CONTROL METHOD FOR ELECTRONIC APPARATUS, PROGRAM, AND STORAGE MEDIUM

(71) Applicant: CANON KABUSHIKI KAISHA, Tokyo (JP)

(72) Inventor: Yoshihiro Funatsu, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 10 days.

(21) Appl. No.: 17/837,869

(22) Filed: Jun. 10, 2022

(65) Prior Publication Data
US 2022/0400207 A1 Dec. 15, 2022

(30) Foreign Application Priority Data
Jun. 14, 2021 (JP) ................... 2021-098471

(51) Int. Cl.
H04N 5/232 (2006.01)
G06T 7/20 (2017.01)
H04N 23/62 (2023.01)
H04N 23/67 (2023.01)
H04N 23/695 (2023.01)

(52) U.S. Cl.
CPC .............. *H04N 23/695* (2023.01); *G06T 7/20* (2013.01); *H04N 23/62* (2023.01); *H04N 23/675* (2023.01); *G06T 2207/10148* (2013.01)

(58) Field of Classification Search
None
See application file for complete search history.

(56) References Cited

U.S. PATENT DOCUMENTS

| 10,419,658 B1* | 9/2019 | Haynold | H04N 23/64 |
| 2013/0058525 A1* | 3/2013 | Sugio | G06T 7/248 |
| | | | 382/103 |
| 2016/0080743 A1* | 3/2016 | Lee | G06T 7/246 |
| | | | 375/240.03 |
| 2020/0043203 A1* | 2/2020 | Ono | H04N 23/50 |
| 2020/0221017 A1* | 7/2020 | Wada | H04N 23/67 |
| 2021/0343041 A1* | 11/2021 | Wang | G06N 20/00 |

FOREIGN PATENT DOCUMENTS

JP 2010141820 A 6/2010

* cited by examiner

*Primary Examiner* — Edemio Navas, Jr.
(74) *Attorney, Agent, or Firm* — Canon U.S.A., Inc. IP Division

(57) ABSTRACT

A control method for an electronic apparatus includes tracking a tracking target included in an image, moving a tracking start position, starting tracking of the tracking target from the tracking start position, stopping tracking of the tracking target, controlling first processing for, at the stopping of tracking, setting the tracking start position to a position at which the tracking target has been tracked until immediately before the stopping of tracking and second processing for, at the stopping of tracking, setting the tracking start position to a previously determined tracking start position, and selecting one of the first processing and the second processing according to a state obtained at the stopping of tracking and performing the selected first or second processing.

9 Claims, 15 Drawing Sheets

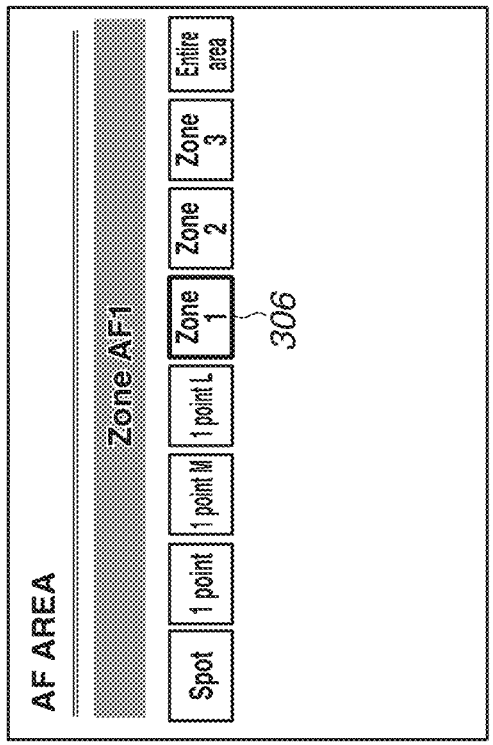
FIG.3A
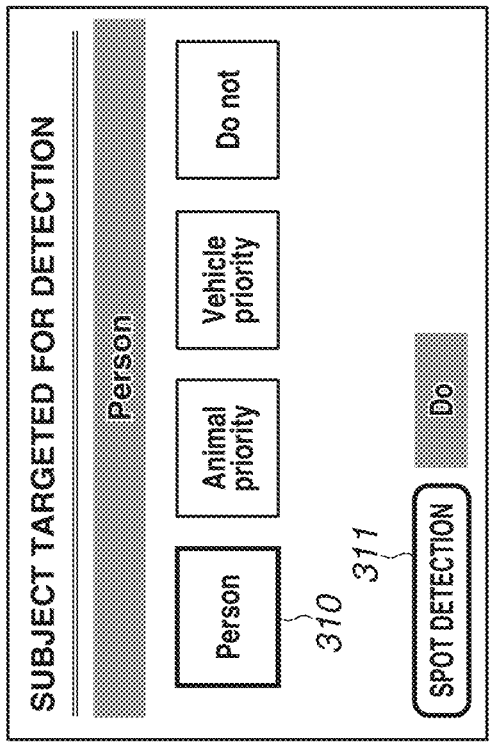
FIG.3B
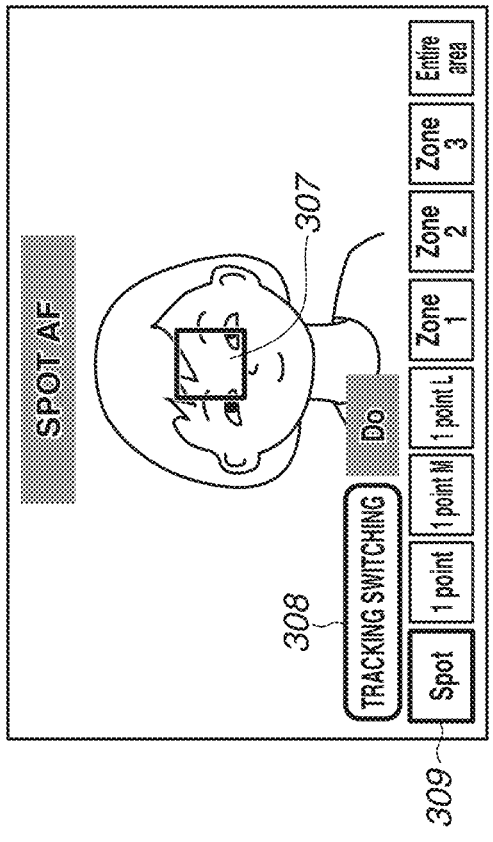
FIG.3C
FIG.3D

FIG.4C
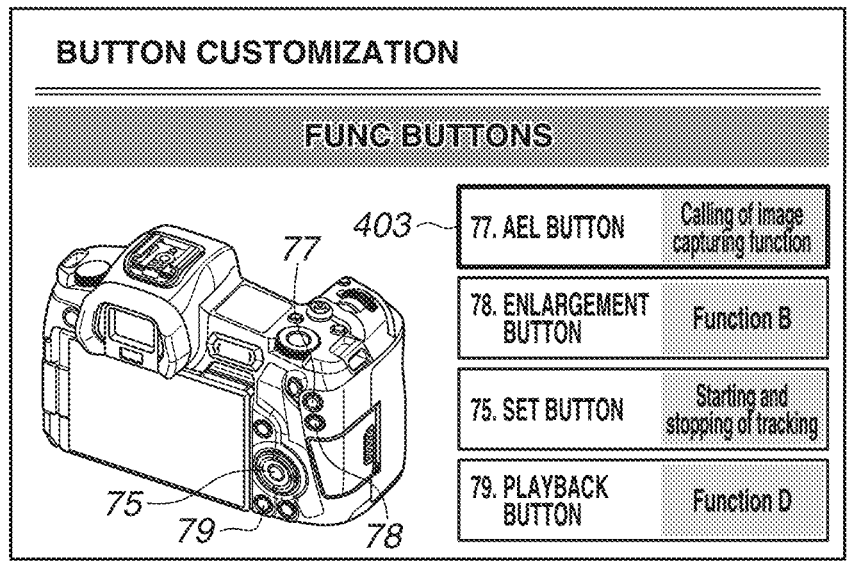
FIG.4D
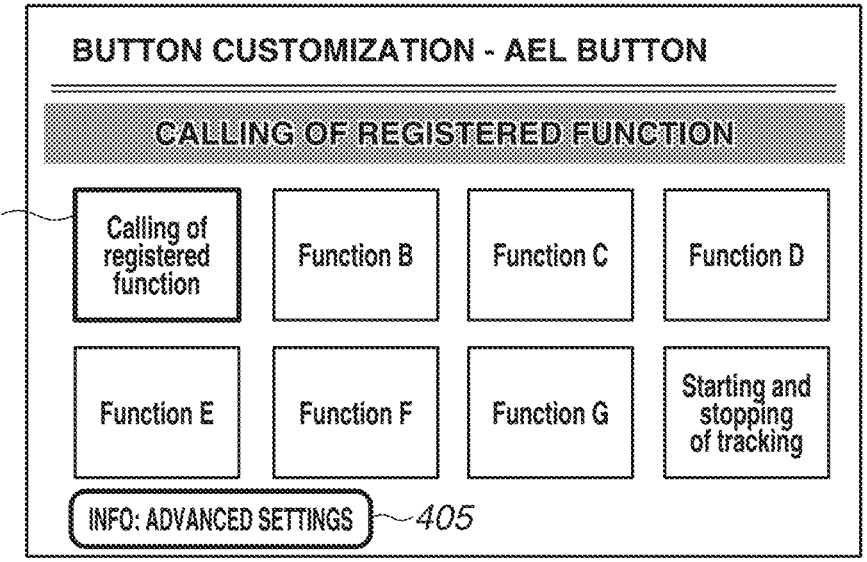
FIG.4E
| | | | |
|---|---|---|---|
| ☑ | AF OPERATION | One-shot / Servo | 408 |
| ☑ | AF AREA | 1 point / Zone / Entire area ... | |
| ☑ | CALLING POSITION | Current position / HP | |
| ☐ | TRACKING | Do / Do not | |
| ☑ | SUBJECT TARGETED FOR DETECTION | Person / Animal / Vehicle / Do not | |
| ☐ | SPOT DETECTION | Do / Do not | |
| ☑ | PUPIL DETECTION | Do / Do not | |
CALLING OF REGISTERED FUNCTION > ADVANCED SETTINGS

| | | AF AREA | | | | | | | |
|---|---|---|---|---|---|---|---|---|---|
| | 506 | Spot | 1 point | 1 point M | 1 point L | Zone 1 | Zone 2 | Zone 3 | Entire area |
| TRACKING SETTING | OFF | ▢ | □ | ⊞ | ⊞⊞ | ⌐¬ | ⌐¬ | ⌐¬ | ⌐¬ |
| | ON | ▢● | □● | ⊞● | ⊞⊞● | ⌐¬● | ⌐¬● | ⌐¬● | ⌐¬● |

| | 507 | ONE-SHOT | SERVO |
|---|---|---|---|
| AF OPERATION | | ONE SHOT | SERVO |

| | 508 | PERSON | ANIMAL | VEHICLE | DO NOT |
|---|---|---|---|---|---|
| SUBJECT TARGETED FOR DETECTION | | 👤 | 🐾 | 🚗 | OFF |

| | 509 | DO | DO NOT |
|---|---|---|---|
| PUPIL DETECTION | | 👁 ON | 👁 OFF |

| | 510 | ON | OFF |
|---|---|---|---|
| TRACKING CONTROL STATE | | ⌐¬ ON | ⌐¬ OFF |

FIG.6

| | BEFORE TRIGGERING OF AF (SW0) | AFTER TRIGGERING OF AF (SW1/SW2) |
|---|---|---|
| SPOT, 1 POINT, AREA EXPANDING | 601 | 602 |
| ZONE, ENTIRE AREA | 603 | 604 |
| DETECTION FRAME | 605 | 606 |
| TRACKING FRAME (TRACKING) | 607 | 608 |

FIG.7

| | | AF AREA | | |
|---|---|---|---|---|
| | | SPOT, 1 POINT, AREA EXPANDING | ZONE | ENTIRE AREA |
| DO NOT PERFORM TRACKING | AF AREA FRAME BEING ACTIVE | 7-A | 7-B | 7-C |
| | DETECTION FRAME BEING ACTIVE | 7-D | 7-E | 7-F |
| | TRACKING FRAME BEING ACTIVE | 7-G | 7-H | 7-I |
| PERFORM TRACKING | AF AREA FRAME BEING ACTIVE | 7-J | 7-K | 7-L |
| | DETECTION FRAME BEING ACTIVE | 7-M | 7-N | 7-O |
| | TRACKING FRAME BEING ACTIVE | 7-P | 7-Q | 7-R |

ELECTRONIC APPARATUS CAPABLE OF TRACKING OBJECT, CONTROL METHOD FOR ELECTRONIC APPARATUS, PROGRAM, AND STORAGE MEDIUM

BACKGROUND OF THE DISCLOSURE

Field of the Disclosure

Aspects of the present disclosure generally relate to an electronic apparatus, a control method for the electronic apparatus, a program, and a storage medium.

Description of the Related Art

Recently, there has been appearing an electronic apparatus such as a digital camera having the function of automatically detecting a subject serving as a tracking target and performing tracking thereof. Such an apparatus shows the user a tracking state by updating, as needed, an index (e.g., a frame display) representing the position or size of a subject which is displayed on a display screen.

Moreover, particularly, some imaging apparatuses such as digital cameras equipped with a focus lens have also the function of continuing adjusting focus while tracking a subject by performing focus control while causing an autofocus (AF) area (AF frame) to automatically track the subject.

Moreover, in addition to the function of automatically detecting a subject and then performing tracking, a function of, in response to the user previously setting a position with which to start tracking and then performing a tracking starting operation, tracking a subject located near the set position is also known. This enables starting tracking at the user's favorite timing.

In a method discussed in Japanese Patent Application Laid-Open No. 2010-141820, in a case where AF frame automatic tracking is not being performed, the AF frame is fixed at the center of an image which is being captured. In a case where the user wishes to perform AF frame automatic tracking with a predetermined subject set as a tracking target, when the user performs an image capturing angle-of-view operation for the camera in such a manner that the subject is included in the range of the AF frame set at the center and then issues an instruction for starting tracking, AF frame automatic tracking is started with the subject set as a tracking target. Then, when the user issues an instruction for stopping tracking, processing for AF frame automatic tracking is stopped, the AF frame is returned to the center of the image capturing range, and AF frame automatic tracking is not performed.

However, in the case of the method discussed in Japanese Patent Application Laid-Open No. 2010-141820, when the user issues an instruction for stopping tracking, the tracking start position results in returning to the original center position for the AF frame, so that, since the continuity of tracking is broken, the user may miss a photo opportunity.

SUMMARY OF THE DISCLOSURE

Aspects of the present disclosure are generally directed to a method capable of setting an optimum tracking start position.

According to an aspect of the present disclosure, an electronic apparatus includes one or more processors that execute a program stored in a memory and thereby function as a tracking unit configured to track a tracking target included in an image, a movement unit configured to move a tracking start position, a tracking starting unit configured to start tracking by the tracking unit from the tracking start position, a tracking stopping unit configured to stop tracking performed by the tracking unit, and a control unit configured to control first processing for, at the stopping of tracking, setting the tracking start position to a position at which the tracking target has been tracked until immediately before the stopping of tracking and second processing for, at the stopping of tracking, setting the tracking start position to a previously determined tracking start position, wherein the control unit selects one of the first processing and the second processing according to a state obtained at the stopping of tracking and performs the selected first or second processing.

According to another aspect of the present disclosure, a control method for an electronic apparatus includes tracking a tracking target included in an image, moving a tracking start position, starting tracking of the tracking target from the tracking start position, stopping tracking of the tracking target, controlling first processing for, at the stopping of tracking, setting the tracking start position to a position at which the tracking target has been tracked until immediately before the stopping of tracking and second processing for, at the stopping of tracking, setting the tracking start position to a previously determined tracking start position, and selecting one of the first processing and the second processing according to a state obtained at the stopping of tracking and performing the selected first or second processing.

According to an exemplary embodiment of the present disclosure, it is possible to set an optimum tracking start position.

Further features of the present disclosure will become apparent from the following description of exemplary embodiments with reference to the attached drawings.

BRIEF DESCRIPTION OF THE DRAWINGS

FIGS. 3A, 3B, 3C, and 3D are diagrams concerning a menu for changing setting values.

FIGS. 4A, 4B, 4C, 4D, and 4E are diagrams concerning a menu for setting a button customization function for triggering of tracking and a function call.

FIG. 6 is a diagram illustrating frame displays obtained before and after triggering of autofocus (AF) (operation).

FIG. 7 is a diagram illustrating frame displays each associated with a combination of an AF area and a tracking setting.

DESCRIPTION OF THE EMBODIMENTS

The present disclosure will now be described in detail below with reference to the accompanying drawings illustrating exemplary embodiments thereof. Configurations described in the following exemplary embodiments are merely examples, and the scope of the present disclosure should not be construed to be limited by the configurations described in the respective exemplary embodiments.

<Configuration of Digital Camera>

Figure 1A:
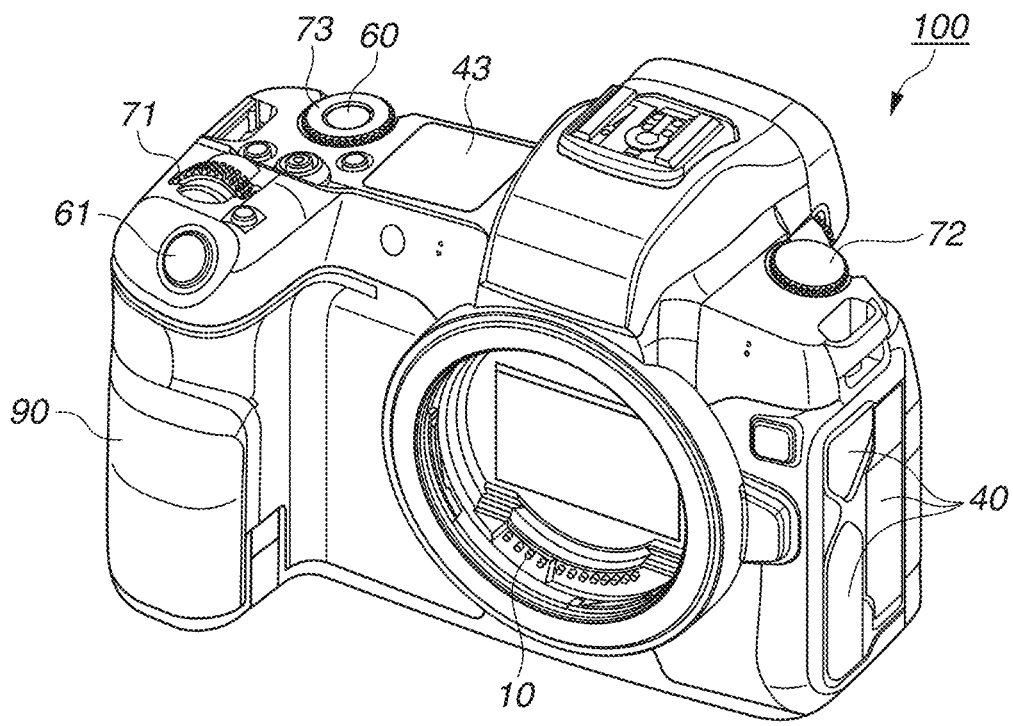
FIGS. 1A and 1B are appearance diagrams of a digital camera according to an exemplary embodiment of the present disclosure.
Figure 1B:
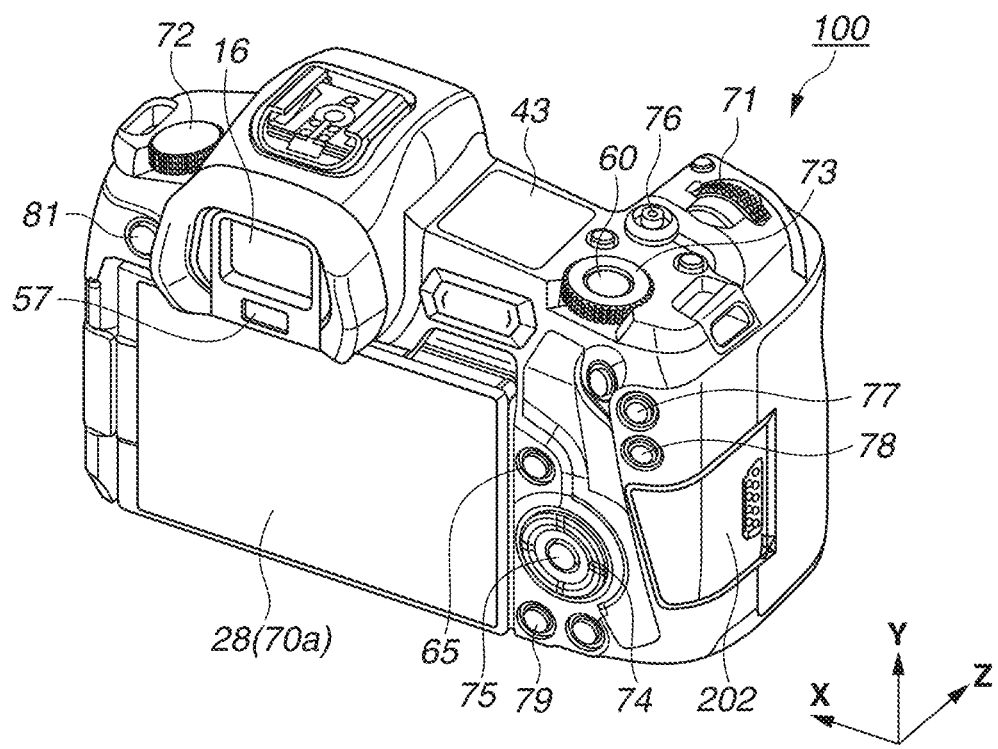

FIGS. 1A and 1B are appearance diagrams of a digital camera 100, which serves as an example of an apparatus (electronic apparatus) to which the present disclosure is applicable. FIG. 1A is a front surface perspective view of the digital camera 100, and FIG. 1B is a back surface perspective view of the digital camera 100. Referring to FIGS. 1A and 1B, a display unit 28 is a display unit mounted on the back surface of the digital camera 100, which displays an image and various pieces of information. A touch panel 70a is capable of detecting a touch operation on the display surface (operation surface) of the display unit 28. An extra-viewfinder display unit 43 is a display unit mounted on the top surface of the digital camera 100, which displays various setting values for the digital camera 100, such as a shutter speed and an aperture value. A shutter button 61 is an operation unit which is usable to issue an image capturing instruction. A mode selection switch 60 is an operation unit which is usable to switch between various modes. A terminal cover 40 is a cover which protects connectors (not illustrated) of, for example, a connection cable which interconnects an external device and the digital camera 100.

A main electronic dial 71 is a rotational operation member, so that the main electronic dial 71 can be rotated by the user to perform, for example, changing of setting values such as a shutter speed and an aperture value. A power switch 72 is an operation member which is usable to switch between turning-on and turning-off of the power source of the digital camera 100. A sub-electronic dial 73 is a rotational operation member included in the operation unit 70, which is usable to perform, for example, movement of a selection frame or image feeding. Arrow keys 74 are arrow-key operation members (four-way keys) in which upper, lower, left, and right arrow portions thereof are able to be pressed with respect to four directions. An operation corresponding to a pressed arrow portion of the arrow keys 74 is able to be performed. A SET button 75 is a push button, which is mainly used to, for example, determine a selection item. A moving image button 76 is usable to issue instructions for starting and stopping moving image capturing (recording).

An automatic exposure (AE) lock button 77 is usable to fix an exposure state by being pressed when the digital camera 100 is in an image capturing standby state. An enlargement button 78 is an operation button, which is usable to perform turning-on and turning off of an enlargement mode in live view display of an image capturing mode. The user is allowed to enlarge or reduce a live view image by turning on the enlargement mode and then operating the main electronic dial 71. In a playback mode, the enlargement button 78 functions as an enlargement button which is usable to enlarge a played-back image and increase an enlargement factor. A playback button 79 is an operation button used to switch between the image capturing mode and the playback mode. When the playback button 79 is pressed during the image capturing mode, the digital camera 100 transitions to the playback mode, thus causing the display unit 28 to display the latest image out of images recorded on a recording medium 200. When a menu button 81 is pressed, a menu screen which is available for various settings is displayed on the display unit 28. The user is allowed to intuitively perform various settings with use of the menu screen displayed on the display unit 28, the arrow keys 74, and the SET button 75 or a multi-controller (hereinafter referred to as "MC") 65. The MC 65 is capable of receiving direction instructions representing eight directions and a pushing operation on a central portion thereof.

A communication terminal group 10 is a communication terminal group via which the digital camera 100 performs communication with a lens unit 150 (attachable to and detachable from the digital camera 100). An eyepiece unit 16 is an eyepiece portion of an eyepiece viewfinder (a looking-into-type viewfinder), so that the user is able to visually recognize a video image displayed on an internal electronic viewfinder (EVF) 29 via the eyepiece unit 16. An eye access detection unit 57 is an eye access detection sensor which detects whether the user is accessing the eyepiece unit 16. A lid 202 is the lid of a slot in which the recording medium 200 is stored.

A grip portion 90 is a holding portion configured to be in a shape able to be easily gripped by the right hand of the user when the user holds the digital camera 100. The shutter button 61 and the main electronic dial 71 are located at positions where the shutter button 61 and the main electronic dial 71 are able to be operated with the index finger of the right hand in a state in which the user holds the digital camera 100 by gripping the grip portion 90 with the little finger, ring finger, and middle finger of the right hand. Moreover, the sub-electronic dial 73 is located at a position where the sub-electronic dial 73 is able to be operated with the thumb of the right hand in the same state.

Figure 2:
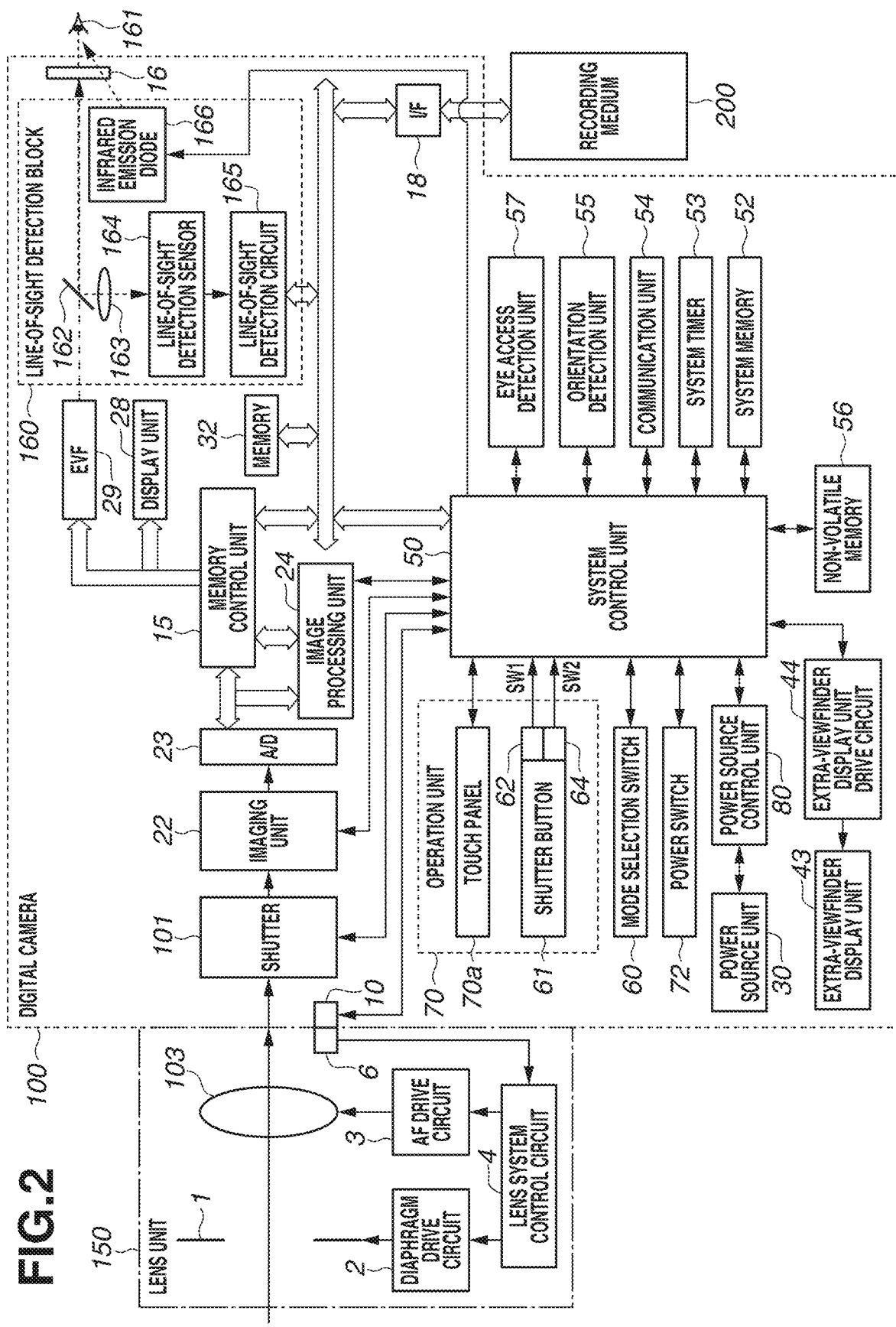
FIG. 2 is a block diagram illustrating a configuration example of the digital camera.

FIG. 2 is a block diagram illustrating a configuration example of the digital camera 100 according to the present exemplary embodiment. In FIG. 2, the lens unit 150 is a lens unit in which an interchangeable image capturing lens is mounted. A lens 103 is usually composed of a plurality of lens elements, but, in FIG. 2, is illustrated simply as a single lens element. A communication terminal group 6 is a communication terminal group used for the lens unit 150 to perform communication with the digital camera 100. The lens unit 150 performs communication with a system control unit 50 via the communication terminal group 6 and the above-mentioned communication terminal group 10, and causes a lens system control circuit 4, which is included in the lens unit 150, to perform control of a diaphragm 1 via a diaphragm drive circuit 2. Then, the lens unit 150 causes the lens system control circuit 4 to vary the position of the lens 103 via an autofocus (AF) drive circuit 3, thus adjusting focus.

A shutter 101 is a focal plane shutter capable of freely controlling the exposure time of an imaging unit 22 under the control of the system control unit 50.

The imaging unit 22 is an image sensor configured with, for example, a charge-coupled device (CCD) sensor or a complementary metal-oxide semiconductor (CMOS) sensor, which converts an optical image into an electrical signal. An analog-to-digital (A/D) converter 23 is used to convert an analog signal output from the imaging unit 22 into a digital signal.

An image processing unit 24 performs predetermined pixel interpolation, resizing processing such as reduction, and color conversion processing on the data output from the A/D converter 23 or data output from a memory control unit 15 described below.

Moreover, the image processing unit 24 performs predetermined calculation processing using the captured image data. The system control unit 50 performs exposure control and distance measurement control based on a calculation result obtained by the image processing unit 24. With this, autofocus (AF) processing of the through-the-lens (TTL) type, automatic exposure (AE) processing, and electronic flash (EF) (flash preliminary light emission) processing are performed. The image processing unit 24 further performs predetermined calculation processing using the captured image data, and performs automatic white balance (AWB) processing of the TTL type based on the obtained calculation result.

The memory control unit 15 controls data transmission and reception between the A/D converter 23, the image processing unit 24, and a memory 32. Data output from the A/D converter 23 is then written in the memory 32 via the image processing unit 24 and the memory control unit 15 or directly via the memory control unit 15 without via the image processing unit 24.

The memory 32 stores image data acquired by the imaging unit 22 and converted into digital data by the A/D converter 23. The memory 32 has a storage capacity sufficient to store a predetermined number of still images or a moving image and sound taken for a predetermined time. Moreover, the memory 32 also serves as a memory for image display (video memory). Image data for display written in the memory 32 is displayed by the display unit 28 and the EVF 29 via the memory control unit 15. Each of the display unit 28 and the EVF 29 performs displaying corresponding to a signal output from the memory control unit 15 on a display device such as a liquid crystal display (LCD) or an organic electroluminescent (EL) display. Sequentially transferring to and displaying on the display unit 28 or the EVF 29 the data analog-to-digital converted by the A/D converter 23 and stored in the memory 32 enables performing live view display (LV display). Hereinafter, an image which is displayed in live view is referred to as a "live view image (LV image)".

An infrared emission diode 166, which is a light emission element used for detecting an eyeball line-of-sight position of the user in a viewfinder screen, radiates infrared light to an eyeball (eye) 161 of the user who has accessed the eyepiece unit 16. Infrared light emitted from the infrared emission diode 166 is reflected by the eyeball (eye) 161, and the reflected infrared light arrives at a dichroic mirror 162. The dichroic mirror 162 reflects only infrared light and allows visible light to pass therethrough. Infrared light the optical path of which has been changed is focused on the imaging plane of a line-of-sight detection sensor 164 via an imaging lens 163. The imaging lens 163 is an optical member which constitutes a line-of-sight detection optical system. The line-of-sight detection sensor 164 is configured with an imaging device such as a CCD-type image sensor.

The line-of-sight detection sensor 164 converts the incident infrared light into an electrical signal and outputs the electrical signal to a line-of-sight detection circuit 165. The line-of-sight detection circuit 165, which includes at least one processor, detects a line-of-sight position of the user from an image or motion of the eyeball (eye) 161 of the user based on an output signal received from the line-of-sight detection sensor 164 and outputs detection information about the line-of-sight position to the system control unit 50. In this way, the dichroic mirror 162, the imaging lens 163, the line-of-sight detection sensor 164, the infrared emission diode 166, and the line-of-sight detection circuit 165 constitute a line-of-sight detection block 160.

The present exemplary embodiment is configured to detect a line of sight by a method called a cornea reflection method with use of the line-of-sight detection block 160. The cornea reflection method is a method of detecting the orientation or position of a line of sight from a positional relationship between reflected light obtained by infrared light emitted from the infrared emission diode 166 being reflected at the eyeball (eye) 161, particularly, the cornea thereof, and the pupil of the eyeball (eye) 161. In addition to this, there are various methods of detecting the orientation or position of a line of sight, such as a method called a scleral reflection method, which uses the reflectance for light differing between the iris and the white part of the eye. Furthermore, a line-of-sight detection method other than the above-mentioned methods can be used as long as it is capable of detecting the orientation or position of a line of sight.

On the extra-viewfinder display unit 43, various setting values for the digital camera 100, such as a shutter speed and an aperture value, are displayed via an extra-viewfinder display unit drive circuit 44.

A non-volatile memory 56 is an electrically erasable and recordable memory, for which, for example, a flash read-only memory (ROM) is used. For example, constants and a program for operations of the system control unit 50 are stored in the non-volatile memory 56. The program as used here is a computer program (computer-executable instructions) which is executed to implement various flowcharts described below in the present exemplary embodiment.

The system control unit 50 is a control unit composed of at least one processor or circuit, and controls the entire digital camera 100. The system control unit 50 implements various processing operations described below in the present exemplary embodiment by executing the above-mentioned program recorded on the above-mentioned non-volatile memory 56. A system memory 52 includes, for example, a random access memory (RAM), on which, for example, constants and variables for operations of the system control unit 50 and a program read out from the non-volatile memory 56 are loaded. Moreover, the system control unit 50 also performs display control by controlling, for example, the memory 32 and the display unit 28.

A system timer 53 is a timer unit which measures times for use in various control operations and time in a built-in clock.

Various operation members serving as an input unit for receiving an operation performed by the user include at least the following operation units. Specifically, such operation members include, as an operation unit 70, the shutter button 61, the MC 65, the touch panel 70a, the main electronic dial 71, the sub-electronic dial 73, the arrow keys 74, the SET button 75, the moving image button 76, the AE lock button 77, the enlargement button 78, the playback button 79, and the menu button 81. Moreover, the mode selection switch 60 and the power switch 72 are also included in the operation members for receiving an operation performed by the user.

The operation unit 70, the mode selection switch 60, and the power switch 72 function as operation units for inputting various operation instructions to the system control unit 50.

The mode selection switch 60 switches an operation mode of the system control unit 50 to any one of, for example, a still image capturing mode, a moving image capturing mode, and a playback mode. Modes included in the still image capturing mode include an automatic image capturing mode, an automatic scene discrimination mode, a manual mode, an aperture priority mode (Av mode), a shutter speed priority mode (Tv mode), and a program automatic exposure (AE) mode (P mode). Moreover, the modes included in the still image capturing mode further include, for example, various scene modes in which image capturing settings for the respective image capturing scenes are performed and a custom mode. The mode selection switch 60 is used to directly switch the operation mode of the system control unit 50 to any one of these modes. Alternatively, after switching to displaying of a list screen for image capturing modes is once performed by the mode selection switch 60, another operation member can also be used to perform switching to any one of a plurality of image capturing modes displayed in the list screen. Likewise, a plurality of modes can also be included in the moving image capturing mode.

Moreover, the shutter button 61 is configured to be a two-stage switch composed of a first shutter switch 62 and a second shutter switch 64.

The first shutter switch 62 is configured to be turned on in response to a halfway operation, in other words, a half-pressed state, of the shutter button 61 of the digital camera 100 (an image capturing preparation instruction), thus generating a first shutter switch signal SW1. In response to the first shutter switch signal SW1, image capturing preparation operations, such as autofocus (AF) processing, automatic exposure (AE) processing, automatic white balance (AWB) processing, and flash preliminary emission (EF) processing, are started.

The second shutter switch 64 is configured to be turned on in response to a complete operation, in other words, a fully-pressed state, of the shutter button 61 (an image capturing instruction), thus generating a second shutter switch signal SW2. In response to the second shutter switch signal SW2, the system control unit 50 starts a series of image capturing processing operations starting with a signal readout operation from the imaging unit 22 and leading to a writing operation for the captured image data as an image file to the recording medium 200.

A power source control unit 80 is configured with, for example, a battery detection circuit, a direct current (DC)-DC converter, and a switch circuit for switching blocks to be energized, and detects the presence or absence of attachment of a battery, the type of a battery, and the remaining amount of battery power. Moreover, the power source control unit 80 controls the DC-DC converter based on a result of such detection and an instruction from the system control unit 50, and supplies required voltages to various portions, including the recording medium 200, for respective required periods. A power source unit 30 includes, for example, a primary battery, such as an alkaline battery or a lithium battery, a secondary battery, such as a nickel-cadmium (NiCd) battery, a nickel-metal hydride (NiMH) battery, or a lithium (Li) battery, or an alternating current (AC) adapter.

A recording medium interface (I/F) 18 is an interface with the recording medium 200, such as a memory card or a hard disk. The recording medium 200 is a recording medium, such as a memory card, which is used to record the captured image, and is configured with, for example, a semiconductor memory or a magnetic disc.

A communication unit 54 connects to an external device or a network via wireless or via a wired cable, and performs transmission and reception of, for example, a video signal and an audio signal. The communication unit 54 is also able to connect to a wireless local area network (LAN) or the Internet. Moreover, the communication unit 54 is also able to connect to an external device via Bluetooth® or Bluetooth® Low Energy. The communication unit 54 is able to transmit an image (including a live view image) captured by the imaging unit 22 and an image recorded on the recording medium 200, and is also able to receive an image or various other pieces of information from an external device.

An orientation detection unit 55 detects the orientation of the digital camera 100 with respect to the direction of gravitational force. Whether an image captured by the imaging unit 22 is an image captured with the digital camera 100 held in a landscape orientation or an image captured with the digital camera 100 held in a portrait orientation can be discriminated based on the orientation detected by the orientation detection unit 55. The system control unit 50 is able to append orientation information corresponding to the orientation detected by the orientation detection unit 55 to an image file of the image captured by the imaging unit 22 or to perform recording with an image rotated. The orientation detection unit 55 to be used includes, for example, an acceleration sensor and a gyroscope sensor. The acceleration sensor or gyroscope sensor serving as the orientation detection unit 55 is also able to be used to detect motions of the digital camera 100 (for example, panning, tilting, lifting, and remaining still or not).

The eye access detection unit 57 is an eye access detection sensor which detects the access (eye access) and the departure (eye departure) of the eye 161 of the user (an object) with respect to the eyepiece unit 16 (i.e., performs access detection). The system control unit 50 switches between displaying (display state) and non-displaying (non-display state) of each of the display unit 28 and the EVF 29 according to the state detected by the eye access detection unit 57. More specifically, in a case where the digital camera 100 is at least in an image capturing standby state and the switching setting for a display destination is automatic switching setting, during non-eye access, the system control unit 50 sets the display unit 28 as the display destination, thus turning on displaying of the display unit 28 and setting the EVF 29 to non-displaying. Moreover, during eye access, the system control unit 50 sets the EVF 29 as the display destination, thus turning on displaying of the EVF 29 and setting the display unit 28 to non-displaying. The eye access detection unit 57 can be configured with, for example, an infrared proximity sensor, and is able to detect the access of an object of some kind to the eyepiece unit 16 of the viewfinder having the EVF 29 incorporated therein. In a case where an object has accessed the eyepiece unit 16, infrared light projected from a light projection portion (not illustrated) of the eye access detection unit 57 is reflected from the object and is then received by a light receiving portion (not illustrated) of the eye access detection unit 57. The eye access detection unit 57 is also able to discriminate up to which distance to the eyepiece unit 16 the object has come close (eye access distance), based on the amount of the received infrared light. In this way, the eye access detection unit 57 performs eye access detection for detecting the access distance of the object to the eyepiece unit 16. Furthermore, in the present exemplary embodiment, the light projection portion and light receiving portion of the eye access detection unit 57 are assumed to be devices different from the above-mentioned infrared emission diode 166 and line-of-sight detection sensor 164. However, the infrared emission diode 166 can also be used as the light projection portion of the eye access detection unit 57. Moreover, the line-of-sight detection sensor 164 can also be used as the light receiving portion of the eye access detection unit 57.

In a case where, starting with the non-eye access state (non-access state), an object which comes close to the eyepiece unit 16 within a predetermined distance has been detected, the eye access detection unit 57 is assumed to detect that eye access has been performed. In a case where, starting with the eye access state (access state), an object the access of which has been detected departs from the eyepiece unit 16 by a predetermined distance or more, the eye access detection unit 57 is assumed to detect that eye departure has been performed. A threshold value used for detecting eye access and a threshold value used for detecting eye departure can be made different from each other by providing, for example, a hysteresis. Moreover, after detecting eye access, the eye access detection unit 57 is assumed to detect that the eye access state continues until detecting eye departure. After detecting eye departure, the eye access detection unit 57 is assumed to detect that the non-eye access state continues until detecting eye access. Furthermore, the infrared proximity sensor is merely an example, and the eye access detection unit 57 can be configured with another type of sensor as long as it is able to detect the access of the eye or object which is able to be deemed as eye access.

The system control unit 50 is able to detect the following operations or states based on outputs from the line-of-sight detection block 160:

the state in which a new line of sight of the user who has performed eye access to the eyepiece unit 16 has been input (detected), in other words, starting of line-of-sight input;

the state in which line-of-sight input by the user who has performed eye access to the eyepiece unit 16 is in a given state;

the state in which the user who has performed eye access to the eyepiece unit 16 is gazing;

the state in which the user who has performed eye access to the eyepiece unit 16 has removed the input line of sight, in other words, ending of line-of-sight input; and the state in which the user who has performed eye access to the eyepiece unit 16 is performing no line-of-sight input.

The term "gazing" as used herein refers to a case where the amount of movement of the line-of-sight position of the user has not exceeded a predetermined value within a predetermined time.

The touch panel 70a and the display unit 28 can be configured in an integrated manner. For example, the touch panel 70a is configured to have such a light transmittance as not to hinder displaying performed by the display unit 28, and is attached to the upper layer of a display surface of the display unit 28. Then, the input coordinates in the touch panel 70a are associated with the display coordinates on a display screen of the display unit 28. With this, a graphical user interface (GUI) can be configured as if the user were able to directly operate a screen displayed on the display unit 28. The system control unit 50 is able to detect the following operations performed on the touch panel 70a or states thereof:

the state in which a finger or pen, which has not been touching the touch panel 70a, has newly touched the touch panel 70a, in other words, starting of a touch (hereinafter referred to as "touch-down");

the state in which a finger or pen is touching the touch panel 70a (hereinafter referred to as "touch-on");

the state in which a finger or pen is moving while touching the touch panel 70a (hereinafter referred to as "touch-move");

the state in which a finger or pen, which has been touching the touch panel 70a, has been separated from the touch panel 70a, in other words, ending of a touch (hereinafter referred to as "touch-up"); and the state in which none is touching the touch panel 70a (hereinafter referred to as "touch-off").

When touch-down is detected, touch-on is also detected at the same time. After touch-down, unless touch-up is detected, touch-on normally continues being detected. Touch-move is also detected in the state in which touch-on is detected. Even if touch-on is detected, unless the touch position is not moving, touch-move is not detected. After touch-up of all of the fingers or pen touching the touch panel 70a is detected, touch-off is detected.

Information on these operations or states and the coordinates of a position at which a finger or pen is touching the touch panel 70a is communicated to the system control unit 50 via an internal bus. The system control unit 50 determines how an operation (touch operation) has been performed on the touch panel 70a based on the communicated information. With regard to touch-move, the system control unit 50 is able to also detect the direction of movement of a finger or pen moving on the touch panel 70a for each of a vertical component and a horizontal component on the touch panel 70a based on a change of the position coordinates. When it is detected that touch-move has been performed a predetermined distance or more, the system control unit 50 is assumed to determine that a slide operation has been performed. An operation of quickly moving the finger a certain degree of distance while keeping the finger touching the touch panel 70a and then directly separating the finger from the touch panel 70a is referred to as "flick". In other words, the flick is an operation of quickly tracing the surface of the touch panel 70a as if flicking the touch panel 70a with the finger. When touch-move performed a predetermined distance or more at a predetermined speed or higher is detected and touch-up is then detected, the system control unit 50 determines that flick has been performed (determines that flick has been performed subsequent to a slide operation). Additionally, a touch operation of concurrently touching a plurality of positions (for example, two points) and then moving the touch positions closer to each other is referred to as "pinch-in", and a touch operation of moving the touch positions away from each other is referred to as "pinch-out". Pinch-out and pinch-in are collectively referred to as a "pinch operation" (or simply as "pinch"). The touch panel 70a can be any type of touch panel selected from among touch panels of various types including, for example, the resistance film type, the capacitance type, the surface acoustic wave type, the infrared ray type, the electromagnetic induction type, the image recognition type, and the optical sensor type. Among these types, there are a type which detects that touch has been performed based on contact with the touch panel and a type which detects that touch has been performed based on access of a finger or pen to the touch panel, but any one of the two types can be employed.

When the touch-move operation is performed in the eye access state, the user is able to set a designation method for the position of positional coordinates corresponding to the touch-move operation to any one of an absolute position designation and a relative position designation. For example, if the positional coordinates are assumed to be an AF frame, in the case of the absolute position designation, when the touch panel 70a is touched, an AF position associated with the touched position (position subjected to coordinate input) is set. Thus, the positional coordinates on which the touch operation has been performed are associated with positional coordinates on the display unit 28. On the other hand, in the case of the relative position designation, the positional coordinates on which the touch operation has been performed are not associated with positional coordinates on the display unit 28. In the case of the relative position designation, irrespective of the touch-down position on the touch panel 70a, the touch position is moved by a distance corresponding to the amount of movement of touch-move in the movement direction of touch-move from the currently set AF position.

<Setting Screen>

FIGS. 3A, 3B, 3C, and 3D are diagrams concerning a menu for changing setting values which are displayed on the display unit 28 or the EVF 29.

FIG. 3A illustrates a setting screen for the menu, in which rows 301 to 305 show respective setting items and setting values.

The setting item in the row 301 is an AF operation, in which "one-shot AF", which locks focus after triggering of AF (after issuance of an image capturing preparation instruction), and "servo AF", which causes focus to perform follow-up, are able to be set.

The setting item in the row 302 is an AF area, in which the size of an area in which to perform AF is able to be set.

In a case where the number of setting values is large, the setting values dive into a deeper layer and become settable via a dedicated screen (illustrated in FIG. 3B). As illustrated in FIG. 3B, the user selects a setting value (such as a key 306) from among the setting values shown side by side.

The setting item in the row 303 is tracking setting, in which whether to perform tracking after triggering of AF (after issuance of an image capturing preparation instruction) is able to be set. A subject targeted for tracking is determined from an AF area obtained before triggering of AF (before issuance of an image capturing preparation instruction), and, after triggering of AF (after issuance of an image capturing preparation instruction), the size of the AF area is expanded to include the entire area, so that tracking is performed with the entire screen. Moreover, in a case where a main subject has been detected by such setting, a detection frame is displayed for the main subject and the user is notified of such detection. The main subject is determined by setting of a subject targeted for detection in the row 304.

The setting item in the row 304 is setting of a subject targeted for detection, in which a type of subject targeted as a priority for detection of a main subject is selected. In the present exemplary embodiment, as illustrated in FIG. 3D, the type of subject is settable by selection from among "person", "animal priority", "vehicle priority", and "do not" (such as a key 310). Advanced setting is able to be further performed depending on a setting value, such as a key 311. Here, the image processing unit 24 is capable of detecting a specific subject using the captured image data. In the present exemplary embodiment, as the specific subject, a person, an animal such as a dog or a wild bird, a vehicle, or a major region in the subject is assumed to be detected (subjected to spot detection). For example, spot detection in a person is detection of a body, head region, pupil, or face. Moreover, for example, spot detection in an animal is detection of a pupil, face, or body. Moreover, for example, spot detection is able to be set when vehicle priority is currently selected, and the driver of a car, the first car of a train, or the cockpit of an airplane is preferentially detected. These detection methods use, for example, a learning technique using machine learning or recognition processing using image processing.

For example, types of machine learning include the following:
(1) a support-vector machine;
(2) a convolutional neural network; and
(3) a recurrent neural network.

Moreover, as an example of recognition processing, there is a method of, in the case of detecting, for example, a face, extracting a skin color region from gradation colors of respective pixels represented by image data and then detecting a face based on the degree of matching with a previously prepared face contour plate. Moreover, there is also a method of, for example, performing face detection by extracting feature points of the face, such as the eye, nose, or mouth, using a known pattern recognition technique. Additionally, the detection method for a major region to which the present exemplary embodiment is applicable is not limited to these methods, but other methods can also be used.

As illustrated in FIG. 3C, there is also a screen via which to concurrently perform setting of an AF area (such as a key 309) and setting of tracking (such as a key 308), and, in the screen, a through-image of live view is being displayed as a background and the user is able to change settings while viewing display of the AF area 307.

<Button Customization Function>

FIGS. 4A, 4B, 4C, 4D, and 4E are diagrams concerning a menu for setting a button customization function for triggering of tracking and calling of a function, which is displayed on the display unit 28 or the EVF 29.

Figure 4A:
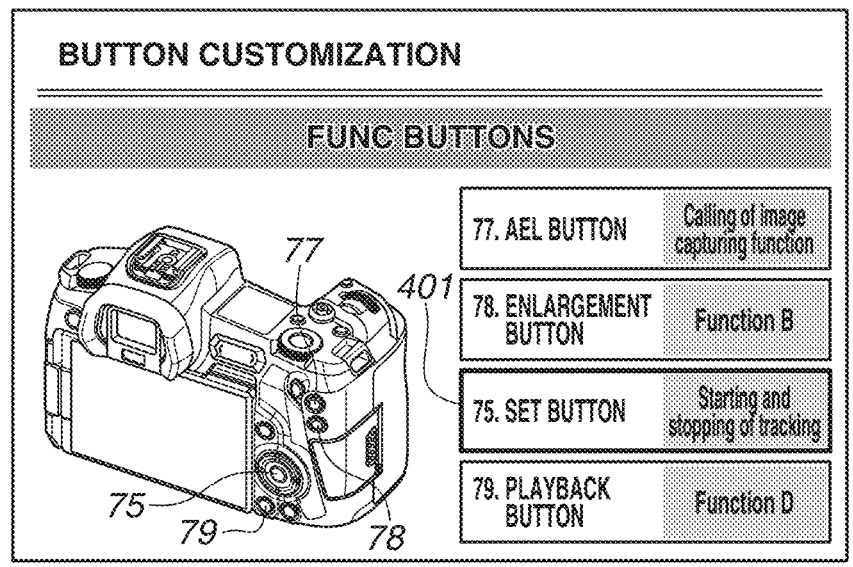
Figure 4B:
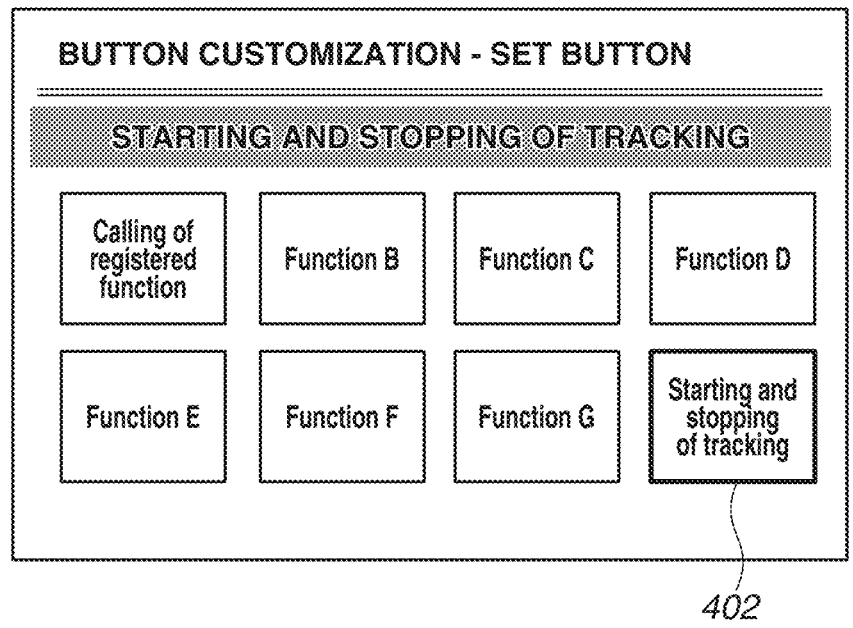

With regard to button customization for triggering of tacking, for example, as a key 401 illustrated in FIG. 4A, if a cursor (index) indicating a position targeted for current processing is applied by the user to an operation member (e.g., a button) targeted for allocation on the screen, a function to be allocated is displayed in a selectable manner as a key 402 illustrated in FIG. 4B. Referring to FIGS. 4A and 4B, the function "starting and stopping of tracking" is applied to the SET button. The function "starting and stopping of tracking" is a function of starting tracking based on the position of an AF area and a function of stopping the started tracking, irrespective of setting of tracking. The present function is able to be also activated with respect to image capturing standby being in progress (SW0), AF triggering being in progress (SW1 ON, the first shutter switch kept pressed), and servo AF continuous shooting being in progress (SW2 ON).

Moreover, for example, as a key 403 illustrated in FIG. 4C, if a cursor is applied by the user to a button targeted for allocation on the screen, a function to be allocated is displayed in a selectable manner as a key 404 illustrated in FIG. 4D. Referring to FIGS. 4C and 4D, the function "calling of registered function" is applied to the AEL (AE lock) button.

The function "calling of registered function" is a function of calling a function previously registered by the user. When a key 405 illustrated in FIG. 4D is pressed by the user, an advanced setting screen illustrated in FIG. 4E is opened. With regard to a checkbox 406 illustrated in FIG. 4E, the user is able to set a setting item 407 targeted for calling and a setting value 408 and check the checkbox 406, thus registering a function to be called. Referring to FIGS. 4D and 4E, "one-shot" is registered as an AF operation, and "HP (home position)" is registered as a calling position. Furthermore, a grayout display indicating that, when each item is being set, another item is not allowed to be registered can be used. For example, referring to FIG. 4E, a grayout display indicating that an AF area is not allowed to be registered is used. Moreover, for example, in the case of items which are not checked by the user, such as tracking setting and spot detection illustrated in FIG. 4E, changing from the current setting values is not performed.

<Icons Indicating Image Capturing Information Displays and Setting Values>

Figures 5A, 5B:
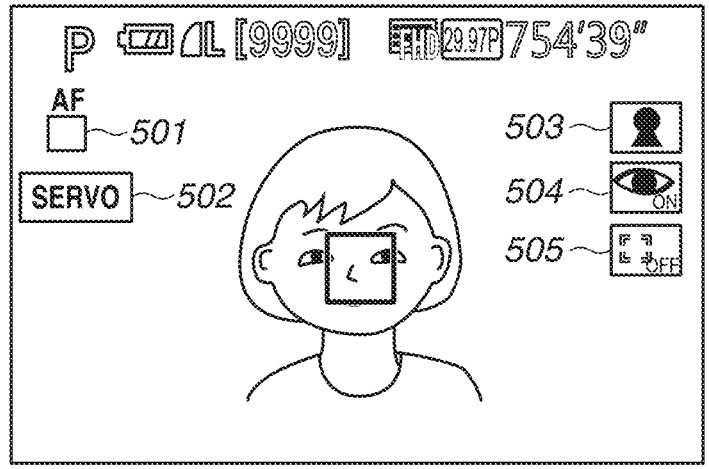
FIGS. 5A and 5B are diagrams illustrating icons indicating image capturing information displays and setting values.

FIGS. 5A and 5B are diagrams illustrating icons indicating image capturing information displays and setting values, which are displayed on the display unit 28 or the EVF 29.

FIG. 5A illustrates an example of a display screen of the display unit 28. An icon 501 indicates an AF area and tracking setting, an icon 502 indicates setting of an AF operation, an icon 503 indicates setting of a subject targeted for detection, and an icon 504 indicates setting of pupil detection. An icon 505 indicates a tracking triggering state. Confirming the icons 501 to 505 enables knowing the current settings and states.

FIG. 5B illustrates an example of a list of icon displays. One of icons each expressed by a combination of an AF area and tracking setting, such as an icon 506, is displayed as the icon 501. Icons prepared depending on setting values, such as icons 507, 508, and 509, are displayed as the icons 502 to 504, respectively. An icon indicating a control state of tracking, such as an icon 510, is displayed as the icon 505.

<Frame Displays Before and After Triggering of AF>

FIG. 6 is a diagram illustrating frame displays obtained before and after triggering of AF, which are displayed on the display unit 28 or the EVF 29.

In FIG. 6, frame displays are made to differ in expression between before and after triggering of AF, but can be made to be identical to each other. Moreover, the frame displays can be distinguished by color in such a manner that, in a case where the AF operation is one-shot AF, green is used and, in a case where the AF operation is servo AF, blue is used.

An AF area frame 601 represents a narrow area, such as spot, one point, or area expanding. The AF area frame 601 is a rectangle before triggering of AF, and becomes a heavy-line rectangle such as an AF area frame 602 after triggering of AF.

An AF area frame 603 represents a wide area such as each zone or the entire area. Before triggering of AF, the AF area frame 603 is an area surrounded by "[ ]", and, after triggering of AF, a small rectangular frame 604 is displayed in only a portion which is in focus within the region of the AF area frame 603. A plurality of rectangular frames 604 can be displayed within the region of the AF area frame 603. Moreover, in a case where the AF area frame represents the whole area of the screen, such as the entire area, before triggering of AF, brackets of the AF area frame 603 can be made not to be displayed.

A frame 605 represents a detection frame. The detection frame 605 is displayed with respect to a subject automatically detected by setting of a specific subject targeted for detection. In FIG. 6, since "person" is set, the detection frame 605 is displayed at the face of a person. The detection frame 605 can also be displayed at the region of a pupil depending on setting of pupil detection. Moreover, in a case where "animal" or "vehicle" is set, the detection frame 605 is displayed at the whole body or face of an animal or a vehicle. After triggering of AF, a rectangular frame 606 is displayed in conformity with the detection frame 605. Furthermore, in the present exemplary embodiment, to make a distinction from the AF area frame 602, the rectangular frame 606 is displayed in dotted line. While the detection frame can be updated for every video frame to be used to track a subject, the position of the detection frame is fixed at a position which has been in focus only after triggering of AF for one-shot.

A frame 607 represents a tracking frame (follow-up frame). The tracking frame 607 is displayed in a case where the user has selected the detection frame 605 or in a case where the user has selected a tracking target by a user operation. Examples of the user's selection operation include a plurality of operations such as a selection that is based on an operation position on the touch panel 70a, a selection which is performed by a tracking starting operation, and a selection which is performed with arrow buttons from among a plurality of detection frames. After triggering of AF, the tracking frame is expressed by a dotted-line double rectangle 608. While, as with the detection frame, the tracking frame can also be updated for every video frame to be used to track a subject, the position of the tracking frame is fixed at a position which has been in focus only after triggering of AF for one-shot.

<Frame Expression Associated with Combination of AF Area and Tracking Setting>

FIG. 7 is a diagram illustrating frame expressions each associated with a combination of an AF area and a tracking setting.

Combinations of the case of "do not perform tracking" and AF areas are associated with states 7-A to 7-I, and combinations of the case of "perform tracking" and AF areas are associated with states 7-J to 7-R, and conditions in which the "AF area frame", the "detection frame", and the "tracking frame" are active, respectively, are associated with such states.

First, the case of "do not perform tracking" in the states 7-A to 7-I is described.

In a case where the AF area frame becomes active, AF frames associated with respective settings, such as an AF area frame 701 for one point and an AF area frame 702 for zone, are respectively displayed (states 7-A, 7-B, and 7-C).

In the case of "do not perform tracking", since subject detection processing is not performed, the detection frame never becomes active. Therefore, in the states 7-D, 7-E, and 7-F, there are no frame displays. While, for the sake of explanation, in the states 7-D, 7-E, and 7-F illustrated in FIG. 7, the screen is displayed in grey, live view display is being performed.

Moreover, in a case where a subject has been selected by the user performing selection, tracking frames 703 are respectively displayed (states 7-G, 7-H, and 7-I). The tracking frames to be displayed here correspond to, for example, a tracking frame obtained when tracking has been started based on an operation position on the touch panel 70a and a tracking frame obtained when tracking has been started based on an operation position at the time of start of tracking.

Next, the case of "perform tracking" in the states 7-J to 7-R is described.

With regard to the states 7-J to 7-O, in the case of "perform tracking", when a main subject has been selected, both the AF area frame and the detection frame are displayed, and a frame which actually becomes targeted for in-focus at the time of triggering of AF is made active. Moreover, when no main subject has been detected, only the AF area frame is displayed, so that the same pattern as that in the case of "do not perform tracking" appears.

Selection of a frame which actually becomes targeted for in-focus at the time of triggering of AF when a main subject has been selected is performed as follows.

First, in the case of a condition in which the detection frame does not overlap the inside of the AF area frame, the AF area frame becomes active (states 7-J, 7-K, and 7-L). Furthermore, in a case where no subject has been detected in the AF area frame when the AF area is the entire screen area, as a condition in which the detection frame does not overlap the inside of the AF area frame, the entire AF area also becomes active (state 7-L), but, since the AF area is the entire screen area, frame display is not performed. Therefore, while, for the sake of explanation, the screen is displayed in grey, live view display is performed. In a case where the AF area frame becomes active, AF area frame 704 or 706 is displayed in solid line, and the detection frame is expressed by a transmissive line 705. At the time of triggering of AF, focus adjustment is performed with use of the AF area frame.

Next, in the case of a condition in which the detection frame overlaps the inside of the AF area frame, the detection frame becomes active (states 7-M, 7-N, and 7-O). Furthermore, in the case of, for example, pupil detection or spot detection, when, even if the pupil or spot portion does not overlap the AF area, the face or the whole body constituting a subject overlaps the AF area frame, the detection frame sometimes becomes active. In a case where the detection frame is active, the detection frame is expressed by a sloid line 707 and the AF area frame is expressed by a transmissive lien 708.

In a case where a subject has been selected by the user performing selection and in the case of "perform tracking", when a main subject has been detected, during the process of tracking (states 7-P, 7-Q, and 7-R), the tracking frame is active and only the tracking frame 709 is displayed. Moreover, when no main subject has been detected, the tracking frame is displayed in the same way as that in the pattern of "do not perform tracking".

<State Transitions in the Case of Servo AF>

Figure 8A:
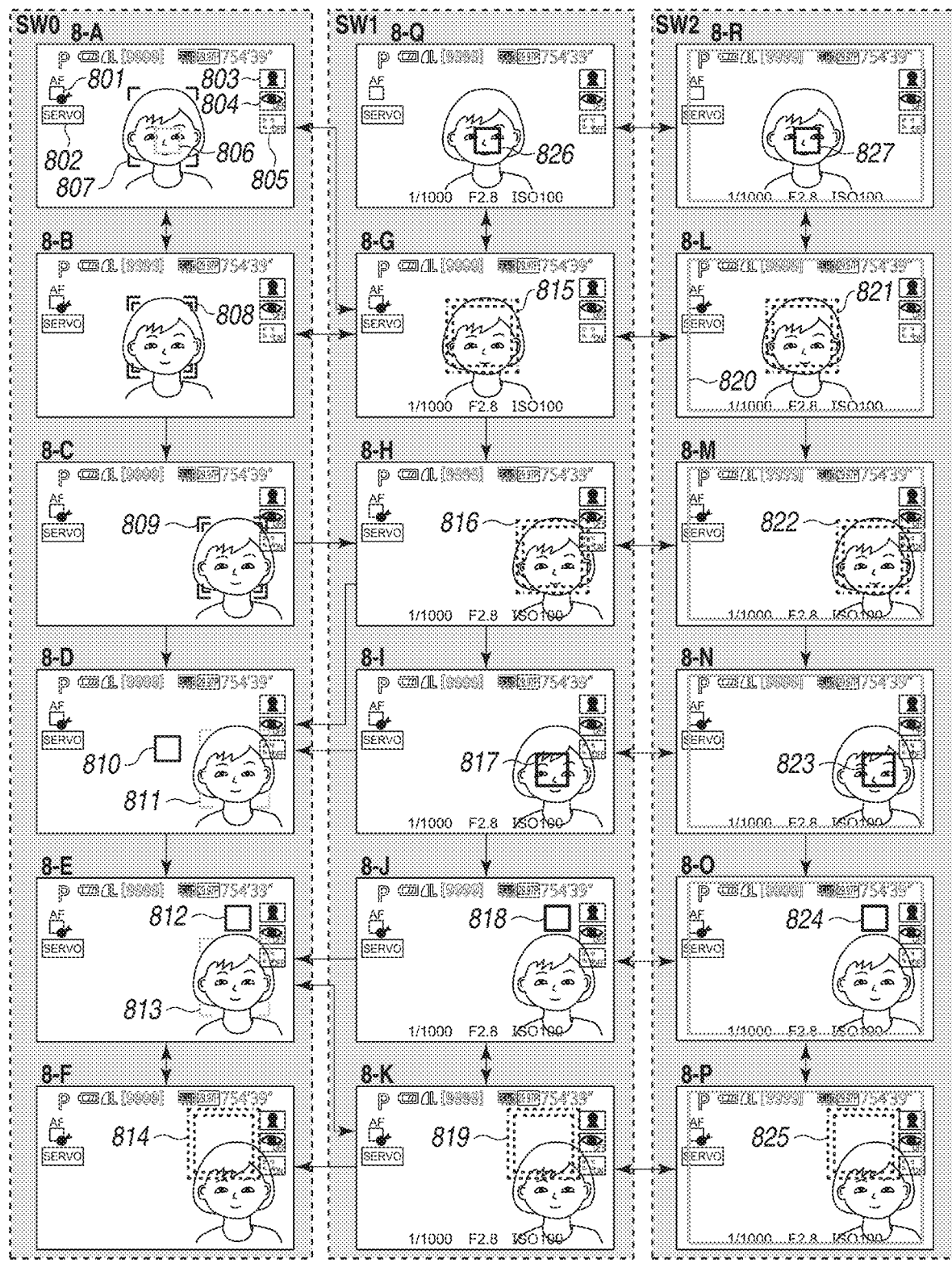
FIGS. 8A and 8B are diagrams illustrating state transitions occurring in the case of servo AF.
Figure 8B:
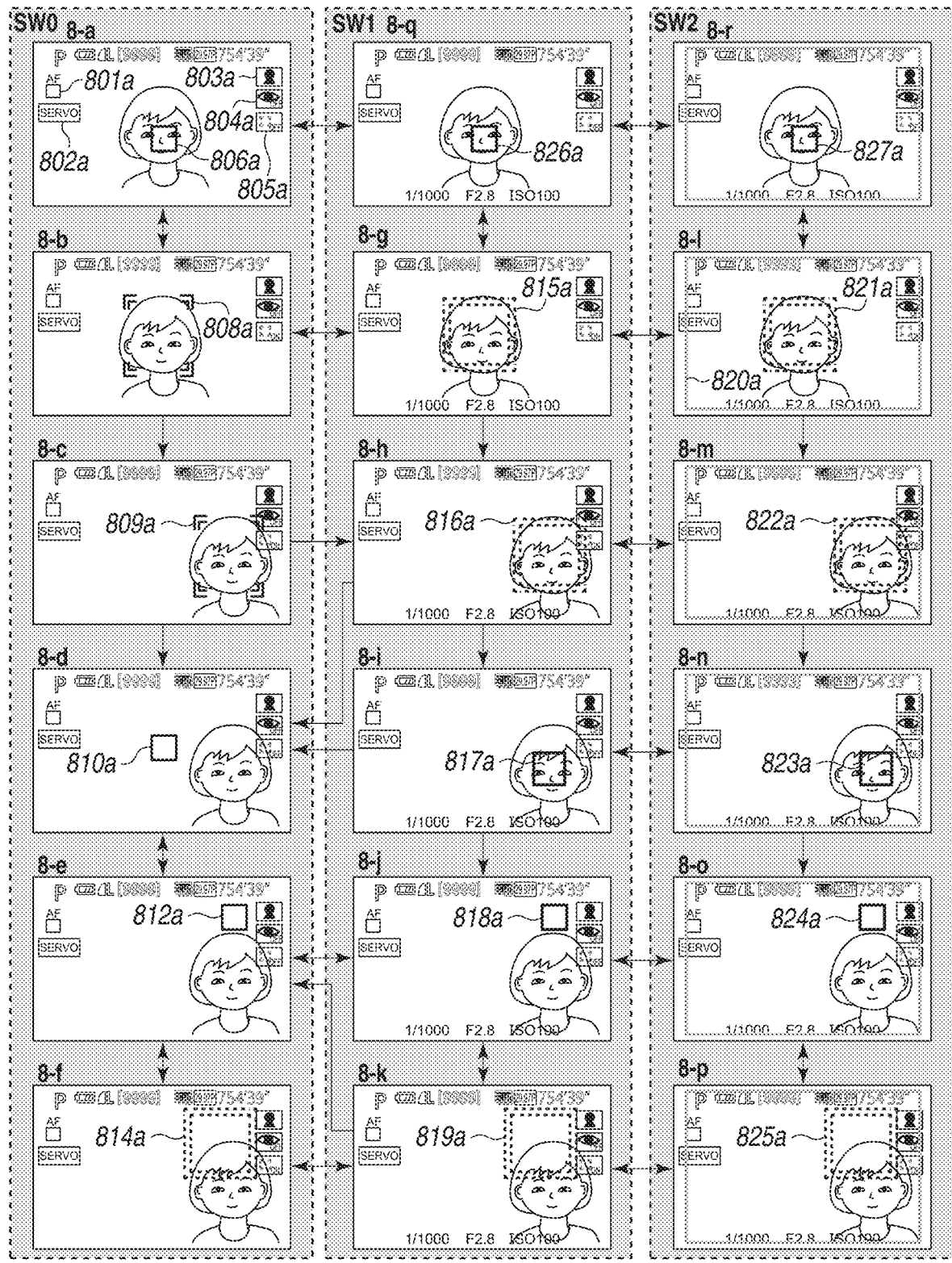

FIGS. 8A and 8B are diagrams illustrating state transitions occurring in the case of servo AF.

States 8-A to 8-R illustrated in FIG. 8A represent a state transition in the case of "perform tracking setting", and states 8-a to 8-r illustrated in FIG. 8B represent a state transition in the case of "do not perform tracking setting".

<In the Case of Performing Tracking>

The state 8-A represents an image capturing standby state (SW0), and icons 801 to 805 represent setting values and state values. Here, the icon 801 represents one point AF×"perform tracking", the icon 802 represents the AF operation being servo AF, the icon 803 represents a subject targeted for detection being a person, the icon 804 represents the pupil detection being OFF, and the icon 805 represents the tracking state being OFF. An AF area frame 806 and a detection frame 807 are also displayed, and, since the detection frame overlaps the inside of the AF area, the detection frame becomes active and the AF area frame becomes inactive. Under this state, in a case where a "tracking starting" operation has been performed, the state 8-A proceeds to the state 8-B, and, in a case where an AF operation (image capturing preparation operation SW1) has been performed, the state 8-A proceeds to the state 8-G.

In the state 8-B, a tracking frame 808 is updated according to motion of the subject. Moreover, the icon 805 switches to ON. Under this state, in a case where a "tracking stopping" operation has been performed, the state 8-B returns to the state 8-A, and, in a case where the AF operation (image capturing preparation operation SW1) has been performed, the state 8-B proceeds to the state 8-G.

In the state 8-C, a tracking frame 809 is updated according to motion of the subject. Here, in a case where the "tracking stopping" operation has been performed, the state 8-C proceeds to the state 8-D, and, in a case where the AF operation (image capturing preparation operation SW1) has been performed, the state 8-B proceeds to the state 8-H.

In the state 8-D, an AF area frame 810 and a detection frame 811 are displayed, and, here, the AF area frame is active. Under this state, in a case where a "frame movement" operation has been performed, the state 8-D proceeds to the state 8-E.

In the state 8-E, an AF area frame 812 and a detection frame 813 are displayed, and, here, the AF area frame is active. Under this state, in a case where the "tracking starting" operation has been performed, the state 8-E proceeds to the state 8-F, and, in a case where the AF operation has been performed, the state 8-E proceeds to the state 8-K.

In the state 8-F, a tracking frame 814 is updated according to motion of the subject. Moreover, the icon 805 switches to ON. Under this state, in a case where the "tracking stopping" operation has been performed, the state 8-F returns to the state 8-E, and, in a case where the AF operation (image capturing preparation operation SW1) has been performed, the state 8-F proceeds to the state 8-K.

In the state 8-G, while a tracking frame 815 is updated according to motion of the subject, focus adjustment is continued (continuous AF). Moreover, the icon 805 switches to ON. Under this state, when a subject targeted for tracking moves, the state 8-G proceeds to the state 8-H, in a case where the "tracking stopping" operation has been performed, the state 8-G proceeds to the state 8-Q, in a case where AF cancellation (cancellation of the image capturing preparation operation SW1) has been performed, the state 8-G returns to the state 8-A, and, in a case where an image capturing operation (SW2) has been performed, the state 8-G proceeds to the state 8-L.

In the state 8-Q, focus adjustment is continued with an AF area 826. The tracking state becomes OFF. Under this state, when the image capturing operation (SW2) is performed, the state 8-Q proceeds to the state 8-R.

In the state 8-H, while a tracking frame 816 is updated according to motion of the subject, focus adjustment is continued.

Under this state, in a case where the "tracking stopping" operation has been performed, the state 8-H proceeds to the state 8-I, in a case where the image capturing operation (SW2) has been performed, the state 8-H proceeds to the state 8-M, and, in a case where the AF cancellation (cancellation of the image capturing preparation operation SW1) has been performed, the state 8-H returns to the state 8-D.

In the state 8-I, focus adjustment is continued with an AF area 817. The tracking state becomes OFF. Under this state, when the image capturing operation (SW2) is performed, the state 8-I proceeds to the state 8-N, and, when the AF cancellation (cancellation of the image capturing preparation operation SW1) is performed, the state 8-I returns to the state 8-D.

In the state 8-J, an AF area 818 is moved according to a user operation. During movement, focus adjustment is continued with the AF area 818. Under this state, when the image capturing operation (SW2) is performed, the state 8-J proceeds to the state 8-O, when the AF cancellation (cancellation of the image capturing preparation operation SW1) is performed, the state 8-J returns to the state 8-E, and, in a case where the "tracking starting" operation has been performed, the state 8-J proceeds to the state 8-K.

In the state 8-K, while a tracking frame 819 is updated according to motion of the subject, focus adjustment is continued.

Under this state, in a case where the "tracking stopping" operation has been performed, the state 8-K returns to the state 8-J, in a case where the image capturing operation (SW2) has been performed, the state 8-K proceeds to the state 8-P, and, in a case where the AF cancellation (cancellation of the image capturing preparation operation SW1) has been performed, the state 8-K returns to the state 8-E or 8-F.

In the state 8-L, while a tracking frame 821 is updated according to motion of the subject, focus adjustment is continued and, then, image capturing is performed. Image capturing being in progress is able to be determined based on displaying of a frame 820. In a case where continuous shooting is currently set, image capturing is continued with a focus position being tracked. Under this state, when a subject targeted for tracking moves, the state 8-L proceeds to the state 8-M, when the image capturing operation (SW2) is canceled, the state 8-L returns to the state 8-G, and, when the "tracking stopping" operation is performed, the state 8-L returns to the state 8-R.

In the state 8-R, focus adjustment is continued with an AF area 827 and, then, image capturing is performed. The tracking state becomes OFF. Under this state, when the "tracking starting" operation is performed, the state 8-R proceeds to the state 8-L, and, when the image capturing operation (SW2) is canceled, the state 8-R returns to the state 8-Q.

In the state 8-M, while a tracking frame 822 is updated according to motion of the subject, focus adjustment is continued and, then, image capturing is performed. Under this state, when the image capturing operation (SW2) is canceled, the state 8-M returns to the state 8-H, and, when the "tracking stopping" operation is performed, the state 8-M proceeds to the state 8-N.

In the state 8-N, focus adjustment is continued with an AF area 823 and, then, image capturing is performed. The tracking state becomes OFF. Under this state, when the "frame movement" operation is performed, the state 8-N proceeds to the state 8-O, and, when the image capturing operation (SW2) is canceled, the state 8-N returns to the state 8-I.

In the state 8-O, focus adjustment is continued with an AF area 824 and, then, image capturing is performed. Under this state, when the image capturing operation (SW2) is canceled, the state 8-O returns to the state 8-J, and, when the "tracking starting" operation is performed, the state 8-O proceeds to the state 8-P.

In the state 8-P, while a tracking frame 825 is updated according to motion of the subject, focus adjustment is continued and, then, image capturing is performed. Under this state, when the image capturing operation (SW2) is canceled, the state 8-P returns to the state 8-K, and, when the "tracking stopping" operation is performed, the state 8-P returns to the state 8-O.

<In the Case of not Performing Tracking>

The state 8-a represents an image capturing standby state, and icons 801a to 805a represent setting values and state values. Here, the icon 801a represents one point AF×"perform tracking", the icon 802a represents the AF operation being servo AF, the icon 803a represents a subject targeted for detection being a person, the icon 804a represents the pupil detection being OFF, and the icon 805a represents the tracking state being OFF. An AF area frame 806a is also displayed. Under this state, in a case where the "tracking starting" operation has been performed, the state 8-a proceeds to the state 8-b, and, in a case where the AF operation (image capturing preparation operation SW1) has been performed, the state 8-a proceeds to the state 8-q.

In the state 8-b, a tracking frame 808a is updated according to motion of the subject. Moreover, the icon 805a switches to ON. Under this state, in a case where the "tracking stopping" operation has been performed, the state 8-b returns to the state 8-a, and, in a case where the AF operation (image capturing preparation operation SW1) has been performed, the state 8-b proceeds to the state 8-g.

In the state 8-c, a tracking frame 809a is updated according to motion of the subject. Here, in a case where the "tracking stopping" operation has been performed, the state 8-c proceeds to the state 8-d, and, in a case where the AF operation (image capturing preparation operation SW1) has been performed, the state 8-c proceeds to the state 8-h.

In the state 8-d, an AF area frame 810a is displayed. Under this state, in a case where the "frame movement" operation has been performed, the state 8-d proceeds to the state 8-e.

In the state 8-e, an AF area frame 812a is displayed. Under this state, in a case where the "tracking starting" operation has been performed, the state 8-e proceeds to the state 8-f, and, in a case where the AF operation has been performed, the state 8-e proceeds to the state 8-j.

In the state 8-f, a tracking frame 814a is updated according to motion of the subject. Moreover, the icon 805a switches to ON. Under this state, in a case where the "tracking stopping" operation has been performed, the state 8-f returns to the state 8-e, and, in a case where the AF operation (image capturing preparation operation SW1) has been performed, the state 8-f proceeds to the state 8-k.

In the state 8-g, while a tracking frame 815a is updated according to motion of the subject, focus adjustment is continued. Moreover, the icon 805a switches to ON. Under this state, when a subject targeted for tracking moves, the state 8-g proceeds to the state 8-h, in a case where the "tracking stopping" operation has been performed, the state 8-g proceeds to the state 8-q, in a case where AF cancellation has been performed, the state 8-g returns to the state 8-b, and, in a case where an image capturing operation (SW2) has been performed, the state 8-g proceeds to the state 8-l.

In the state 8-q, focus adjustment is continued with an AF area 826a. The tracking state becomes OFF. Under this state, when the image capturing operation (SW2) is performed, the state 8-q proceeds to the state 8-r.

In the state 8-h, while a tracking frame 816a is updated according to motion of the subject, focus adjustment is continued. Under this state, in a case where the "tracking stopping" operation has been performed, the state 8-h proceeds to the state 8-i, in a case where the image capturing operation (SW2) has been performed, the state 8-h proceeds to the state 8-m, and, in a case where the AF cancellation (cancellation of the image capturing preparation operation SW1) has been performed, the state 8-h returns to the state 8-d.

In the state 8-i, focus adjustment is continued with an AF area 817a. The tracking state becomes OFF. Under this state, when the image capturing operation (SW2) is performed, the state 8-i proceeds to the state 8-n, and, when the AF cancellation (cancellation of the image capturing preparation operation SW1) is performed, the state 8-i returns to the state 8-d.

In the state 8-j, an AF area 818a is moved according to a user operation. During movement, focus adjustment is continued with the AF area 818a. Under this state, when the image capturing operation (SW2) is performed, the state 8-j proceeds to the state 8-o, when the AF cancellation (cancellation of the image capturing preparation operation SW1) is performed, the state 8-j returns to the state 8-e, and, in a case where the "tracking starting" operation has been performed, the state 8-j proceeds to the state 8-k.

In the state 8-k, while a tracking frame 819a is updated according to motion of the subject, focus adjustment is continued. Under this state, in a case where the "tracking stopping" operation has been performed, the state 8-k returns to the state 8-j, in a case where the image capturing operation (SW2) has been performed, the state 8-k proceeds to the state 8-p, and, in a case where the AF cancellation (cancellation of the image capturing preparation operation SW1) has been performed, the state 8-*k* returns to the state 8-*e* or 8-*f*.

In the state 8-*l*, while a tracking frame 821*a* is updated according to motion of the subject, focus adjustment is continued and, then, image capturing is performed. Image capturing being in progress is able to be determined based on displaying of a frame 820*a*. In a case where continuous shooting is currently set, image capturing is continued with a focus position being tracked. Under this state, when a subject targeted for tracking moves, the state 8-*l* proceeds to the state 8-*m*, when the image capturing operation (SW2) is canceled, the state 8-*l* returns to the state 8-*g*, and, when the "tracking stopping" operation is performed, the state 8-*l* returns to the state 8-*r*.

In the state 8-*r*, focus adjustment is continued with an AF area 827*a* and, then, image capturing is performed. The tracking state becomes OFF. Under this state, when the "tracking starting" operation is performed, the state 8-*r* proceeds to the state 8-*l*, and, when the image capturing operation (SW2) is canceled, the state 8-*r* returns to the state 8-*q*.

In the state 8-*m*, while a tracking frame 822*a* is updated according to motion of the subject, focus adjustment is continued and, then, image capturing is performed. Under this state, when the image capturing operation (SW2) is canceled, the state 8-*m* returns to the state 8-*h*, and, when the "tracking stopping" operation is performed, the state 8-*m* proceeds to the state 8-*n*.

In the state 8-*n*, focus adjustment is continued with an AF area 823*a* and, then, image capturing is performed. The tracking state becomes OFF. Under this state, when the "frame movement" operation is performed, the state 8-*n* proceeds to the state 8-*o*, and, when the image capturing operation (SW2) is canceled, the state 8-*n* returns to the state 8-*i*.

In the state 8-*o*, focus adjustment is continued with an AF area 824*a* and, then, image capturing is performed. Under this state, when the image capturing operation (SW2) is canceled, the state 8-*o* returns to the state 8-*j*, and, when the "tracking starting" operation is performed, the state 8-*o* proceeds to the state 8-*p*.

In the state 8-*p*, while a tracking frame 825*a* is updated according to motion of the subject, focus adjustment is continued and, then, image capturing is performed. Under this state, when the image capturing operation (SW2) is canceled, the state 8-*p* returns to the state 8-*k*, and, when the "tracking stopping" operation is performed, the state 8-*p* returns to the state 8-*o*.

<State Transitions in the Case of One-Shot AF>

Figure 9A:
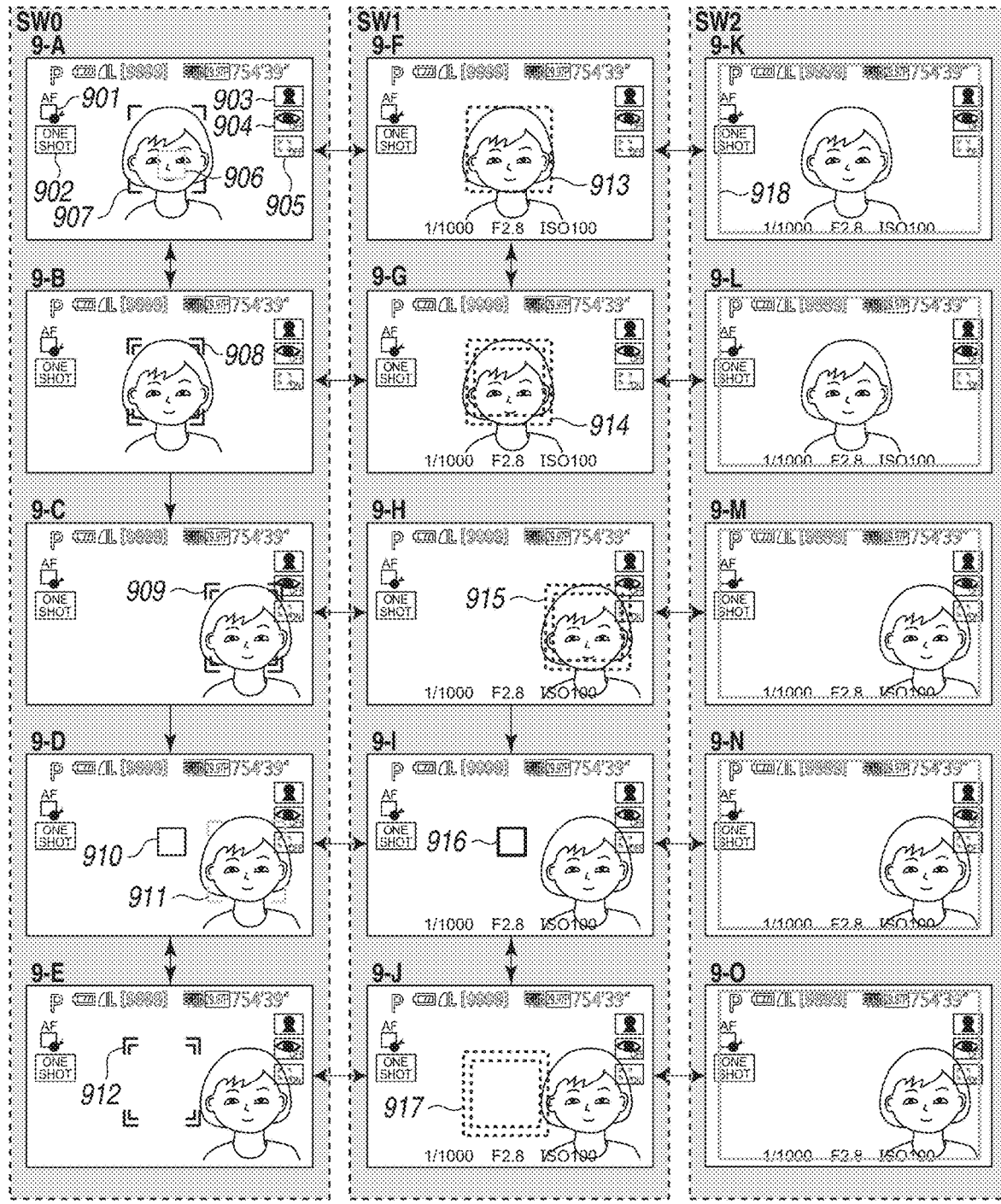
FIGS. 9A and 9B are diagrams illustrating state transitions occurring in the case of one-shot AF.
Figure 9B:
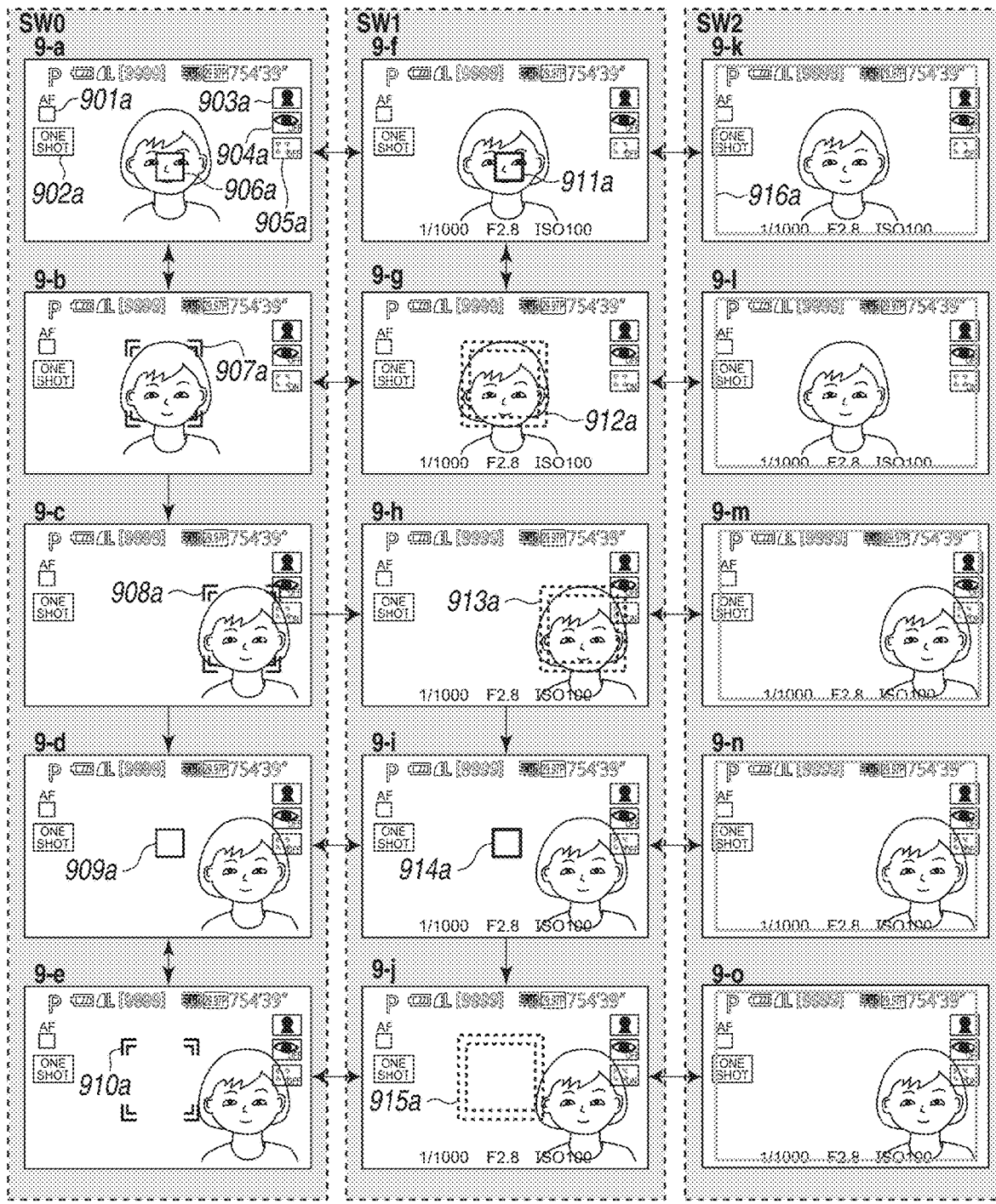

FIGS. 9A and 9B are diagrams illustrating state transitions occurring in the case of one-shot AF.

States 9-A to 9-O illustrated in FIG. 9A represent a state transition in the case of "perform tracking setting", and states 9-*a* to 9-*o* illustrated in FIG. 9B represent a state transition in the case of "do not perform tracking setting".

<In the Case of Performing Tracking>

In the state 9-A, icons 901 to 905 represent setting values and state values. Here, the icon 901 represents one point AF×"perform tracking", the icon 902 represents the AF operation being one-shot AF, the icon 903 represents a subject targeted for detection being a person, the icon 904 represents the pupil detection being OFF, and the icon 905 represents the tracking state being OFF. An AF area 906 and a detection frame 907 are also displayed. Since the detection frame overlaps the inside of the AF area, the detection frame becomes active and the AF area frame becomes inactive.

Under this state, in a case where the "tracking starting" operation has been performed, the state 9-A proceeds to the state 9-B, and, in a case where an AF operation (image capturing preparation operation SW1) has been performed, the state 9-A proceeds to the state 9-F.

In the state 9-B, tracking of a subject is performed with a tracking frame 908. The icon 905 switches to ON. Under this state, in a case where the "tracking stopping" operation has been performed, the state 9-B returns to the state 9-A, in a case where the AF operation (image capturing preparation operation SW1) has been performed, the state 9-B proceeds to the state 9-G, and, when the subject moves in the X-direction or Y-direction of the screen, the state 9-B proceeds to the state 9-C.

In the state 9-C, a tracking frame 909 is updated according to motion of the subject. Under this state, in a case where the "tracking stopping" operation has been performed, the state 9-C proceeds to the state 9-D, and, in a case where the AF operation (image capturing preparation operation SW1) has been performed, the state 9-B proceeds to the state 9-H.

In the state 9-D, an AF area frame 910 and a detection frame 911 are displayed. Since the detection frame is located outside the AF area, the AF area frame becomes active and the detection frame becomes inactive. Under this state, in a case where the "tracking starting" operation has been performed, the state 9-D proceeds to the state 9-E, and, in a case where the AF operation (image capturing preparation operation SW1) has been performed, the state 9-D proceeds to the state 9-I.

In the state 9-E, a tracking frame 912 is updated according to motion of the subject. Moreover, the icon 905 switches to ON. Under this state, in a case where the "tracking stopping" operation has been performed, the state 9-E returns to the state 9-D, and, in a case where the AF operation (image capturing preparation operation SW1) has been performed, the state 9-E proceeds to the state 9-J.

In the state 9-F, one-shot AF is performed with a detection frame 913 and a focus position is locked. Under this state, in a case where the image capturing operation (SW2) is performed, the state 9-F proceeds to the state 9-K, and, in a case where the "tracking starting" operation has been performed, the state 9-F proceeds to the state 9-G. When the AF operation (image capturing preparation operation SW1) is canceled, the state 9-F returns to the state 9-A.

In the state 9-G, one-shot AF is performed with a tracking frame 914 and a focus position is locked. Under this state, in a case where the "tracking stopping" operation has been performed, the state 9-G returns to the state 9-F, when the image capturing operation (SW2) is performed, the state 9-G proceeds to the state 9-L, and, when the AF operation (image capturing preparation operation SW1) is canceled, the state 9-G returns to the state 9-B.

In the state 9-H, one-shot AF is performed with a tracking frame 915 and a focus position is locked. Under this state, in a case where the "tracking stopping" operation has been performed, the state 9-H proceeds to the state 9-I, when the image capturing operation (SW2) is performed, the state 9-H proceeds to the state 9-M, and, when the AF operation (image capturing preparation operation SW1) is canceled, the state 9-H returns to the state 9-C.

In the state 9-I, one-shot AF is performed with an AF area 916 and a focus position is locked.

Under this state, in a case where the "tracking starting" operation has been performed, the state 9-I proceeds to the state 9-J, when the image capturing operation (SW2) is performed, the state 9-I proceeds to the state 9-N, and, when the AF operation (image capturing preparation operation SW1) is canceled, the state 9-I returns to the state 9-D.

In the state 9-J, one-shot AF is performed with a tracking frame 917 and a focus position is locked. The icon 905 switches to ON. Under this state, in a case where the "tracking stopping" operation has been performed, the state 9-J returns to the state 9-I, and, when the image capturing operation (SW2) is performed, the state 9-J proceeds to the state 9-O. When the AF operation (image capturing preparation operation SW1) is canceled, the state 9-J returns to the state 9-E.

In the state 9-K, image capturing is performed with a focus position kept locked. At this time, the detection frame 913 becomes hidden. A frame 918 represents image capturing being in progress. Under this state, an operation such as the "tracking stopping" operation becomes unable to be performed, and, when the image capturing operation (SW2) is canceled, the state 9-K returns to the state 9-F.

In the state 9-L, image capturing is performed with a focus position kept locked. At this time, the detection frame 914 becomes hidden. Under this state, an operation such as the "tracking stopping" operation becomes unable to be performed, and, when the image capturing operation (SW2) is canceled, the state 9-L returns to the state 9-G.

In the state 9-M, image capturing is performed with a focus position kept locked. At this time, the tracking frame 915 becomes hidden. Under this state, an operation such as the "tracking stopping" operation becomes unable to be performed, and, when the image capturing operation (SW2) is canceled, the state 9-M returns to the state 9-H.

In the state 9-N, image capturing is performed with a focus position kept locked. At this time, the AF area 916 becomes hidden. Under this state, an operation such as the "tracking stopping" operation becomes unable to be performed, and, when the image capturing operation (SW2) is canceled, the state 9-N returns to the state 9-I.

In the state 9-O, image capturing is performed with a focus position kept locked. At this time, the tracking frame 917 becomes hidden. Under this state, an operation such as the "tracking stopping" operation becomes unable to be performed, and, when the image capturing operation (SW2) is canceled, the state 9-O returns to the state 9-J.

<In the Case of not Performing Tracking>

In the state 9-a, icons 901a to 905a represent setting values and state values. Here, the icon 901a represents one point AF×"do not perform tracking", the icon 902a represents the AF operation being one-shot AF, the icon 903a represents a subject targeted for detection being a person, the icon 904a represents the pupil detection being OFF, and the icon 905a represents the tracking state being OFF. An AF area 906a is also displayed. Under this state, in a case where the "tracking starting" operation has been performed, the state 9-a proceeds to the state 9-b, and, in a case where the AF operation (image capturing preparation operation SW1) has been performed, the state 9-a proceeds to the state 9-f.

In the state 9-b, tracking of a subject is performed with a tracking frame 907a. The icon 905a switches to ON. Under this state, in a case where the "tracking stopping" operation has been performed, the state 9-b returns to the state 9-a, in a case where the AF operation (image capturing preparation operation SW1) has been performed, the state 9-b proceeds to the state 9-g, and, when the subject moves in the X-direction or Y-direction of the screen, the state 9-b proceeds to the state 9-c.

In the state 9-c, a tracking frame 908a is updated according to motion of the subject. Under this state, in a case where the "tracking stopping" operation has been performed, the state 9-c proceeds to the state 9-d, and, in a case where the AF operation (image capturing preparation operation SW1) has been performed, the state 9-b proceeds to the state 9-h.

In the state 9-d, an AF area 909a is displayed. Under this state, in a case where the "tracking starting" operation has been performed, the state 9-d proceeds to the state 9-e, and, in a case where the AF operation (image capturing preparation operation SW1) has been performed, the state 9-d proceeds to the state 9-i.

In the state 9-e, a tracking frame 910a is updated according to motion of the subject. The icon 905a switches to ON. Under this state, in a case where the "tracking stopping" operation has been performed, the state 9-e returns to the state 9-d, and, in a case where the AF operation (image capturing preparation operation SW1) has been performed, the state 9-e proceeds to the state 9-j.

In the state 9-f, one-shot AF is performed with an AF area 911a and a focus position is locked. Under this state, in a case where the image capturing operation (SW2) is performed, the state 9-f proceeds to the state 9-k, and, in a case where the "tracking starting" operation has been performed, the state 9-f proceeds to the state 9-g. When the AF operation (image capturing preparation operation SW1) is canceled, the state 9-f returns to the state 9-a.

In the state 9-g, one-shot AF is performed with a tracking frame 912a and a focus position is locked. Under this state, in a case where the "tracking stopping" operation has been performed, the state 9-g returns to the state 9-f, when the image capturing operation (SW2) is performed, the state 9-g proceeds to the state 9-l, and, when the AF operation (image capturing preparation operation SW1) is canceled, the state 9-g returns to the state 9-b.

In the state 9-h, one-shot AF is performed with a tracking frame 913a and a focus position is locked. Under this state, in a case where the "tracking stopping" operation has been performed, the state 9-h proceeds to the state 9-i, when the image capturing operation (SW2) is performed, the state 9-h proceeds to the state 9-m, and, when the AF operation (image capturing preparation operation SW1) is canceled, the state 9-h returns to the state 9-c.

In the state 9-i, one-shot AF is performed with an AF area 914a and a focus position is locked. Under this state, in a case where the "tracking starting" operation has been performed, the state 9-i proceeds to the state 9-j, when the image capturing operation (SW2) is performed, the state 9-i proceeds to the state 9-n, and, when the AF operation (image capturing preparation operation SW1) is canceled, the state 9-i returns to the state 9-d.

In the state 9-j, one-shot AF is performed with a tracking frame 915a and a focus position is locked. The icon 905a switches to ON. Under this state, in a case where the "tracking stopping" operation has been performed, the state 9-j returns to the state 9-i, and, when the image capturing operation (SW2) is performed, the state 9-j proceeds to the state 9-o. When the AF operation (image capturing preparation operation SW1) is canceled, the state 9-j returns to the state 9-e.

In the state 9-k, image capturing is performed with a focus position kept locked. At this time, the AF area 911a becomes hidden. A frame 916a represents image capturing being in progress. Under this state, an operation such as the "tracking stopping" operation becomes unable to be performed, and, when the image capturing operation (SW2) is canceled, the state 9-k returns to the state 9-f.

In the state 9-l, image capturing is performed with a focus position kept locked. At this time, the tracking frame 912a becomes hidden. Under this state, an operation such as the "tracking stopping" operation becomes unable to be performed, and, when the image capturing operation (SW2) is canceled, the state 9-*l* returns to the state 9-*g*.

In the state 9-*m*, image capturing is performed with a focus position kept locked. At this time, the tracking frame 913*a* becomes hidden. Under this state, an operation such as the "tracking stopping" operation becomes unable to be performed, and, when the image capturing operation (SW2) is canceled, the state 9-*m* returns to the state 9-*h*.

In the state 9-*n*, image capturing is performed with a focus position kept locked. At this time, the AF area 914*a* becomes hidden. Under this state, an operation such as the "tracking stopping" operation becomes unable to be performed, and, when the image capturing operation (SW2) is canceled, the state 9-*n* returns to the state 9-*i*.

In the state 9-*o*, image capturing is performed with a focus position kept locked. At this time, the tracking frame 915*a* becomes hidden. Under this state, an operation such as the "tracking stopping" operation becomes unable to be performed, and, when the image capturing operation (SW2) is canceled, the state 9-*o* returns to the state 9-*j*.

<Control Flow in the Case of Servo AF>

Figure 10A:
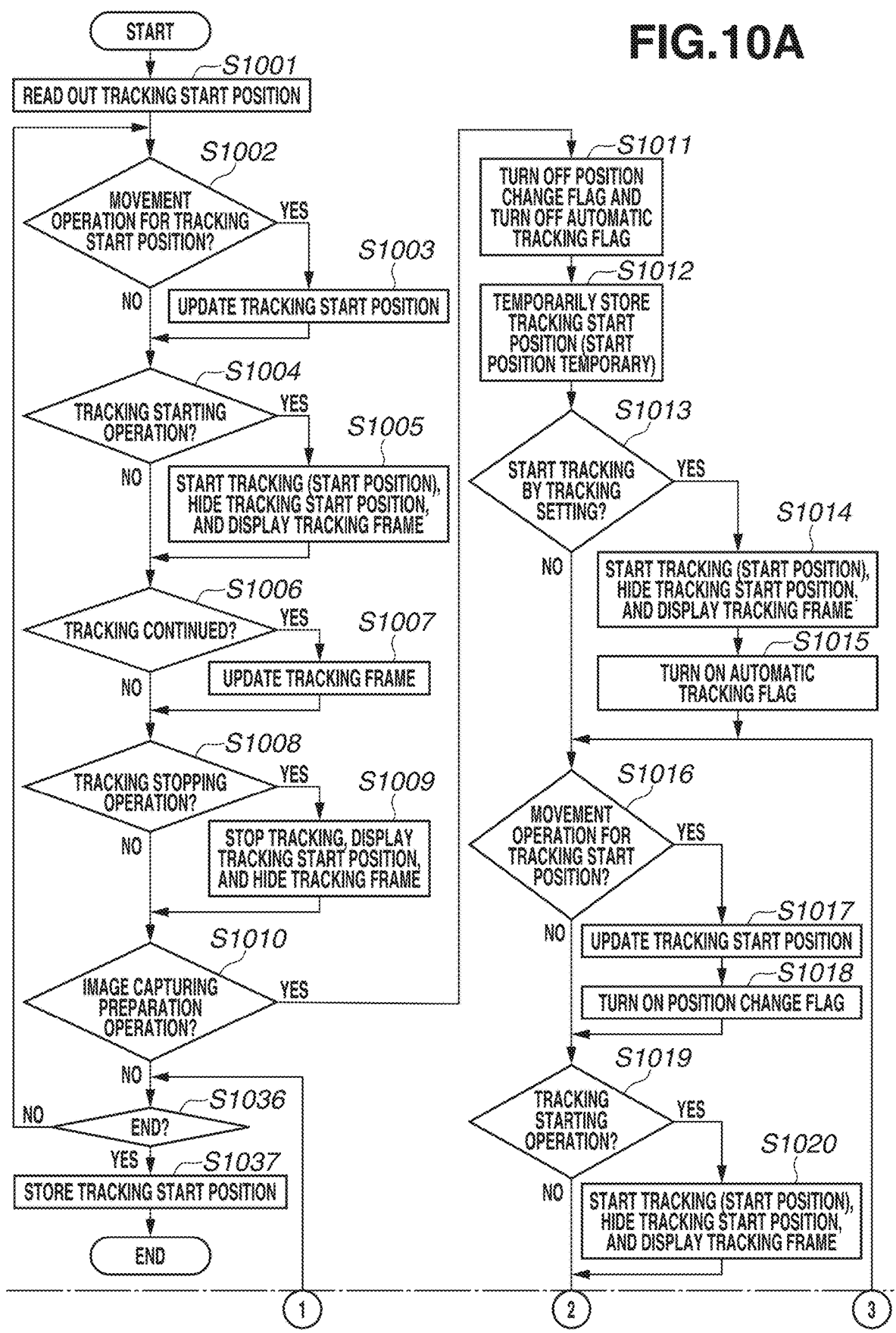
FIGS. 10A and 10B are flowcharts illustrating control which is performed in the case of servo AF.
Figure 10B:
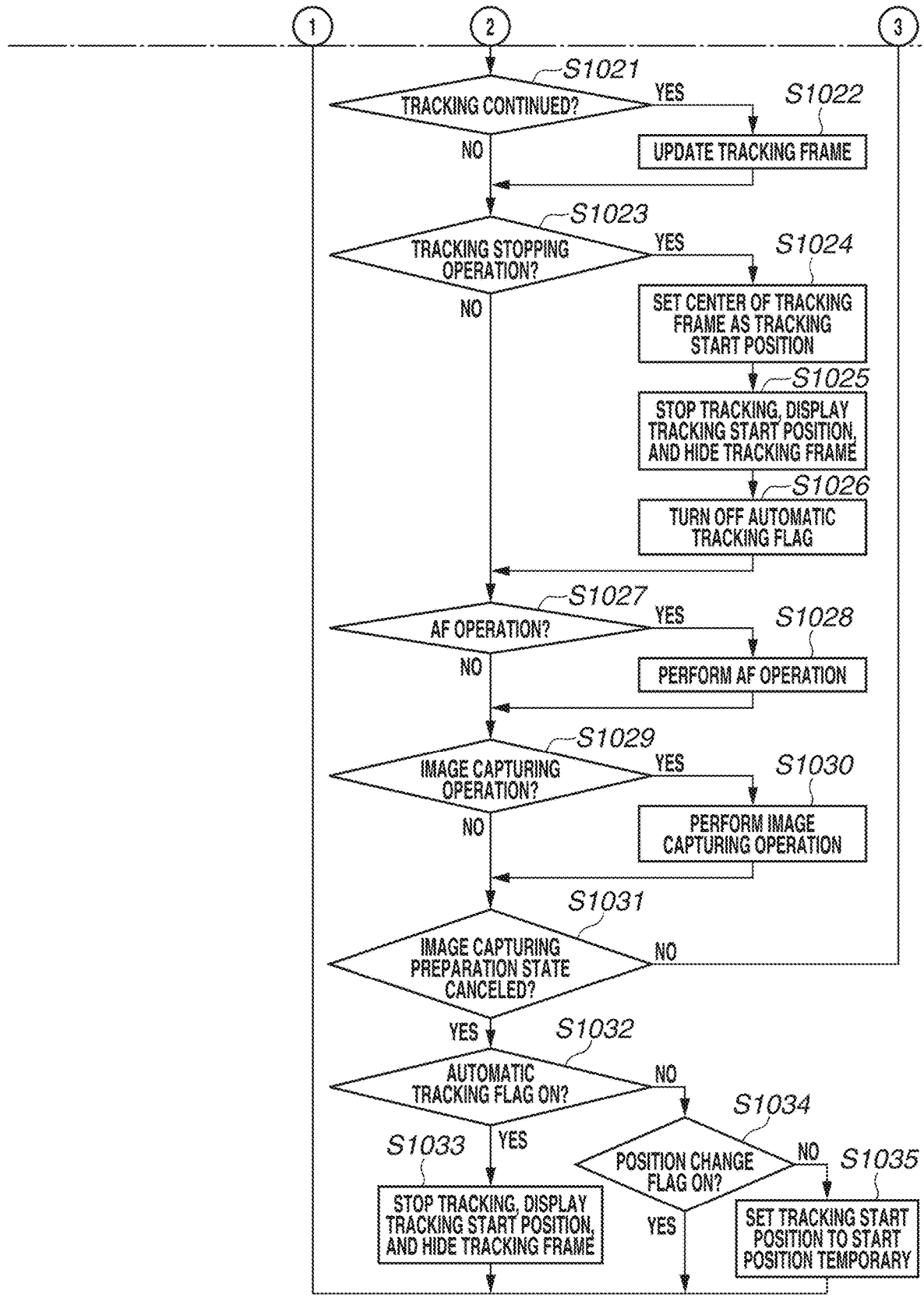

FIGS. 10A and 10B are flowcharts illustrating control which is performed in the case of servo AF. Each processing operation is implemented by the system control unit 50 loading a program stored in the non-volatile memory 56 onto the system memory 52 and executing the program.

In the following flowchart, processing or control is performed by the system control unit 50.

In step S1001, the system control unit 50 reads out a tracking start position from a storage region (memory).

In step S1002, the system control unit 50 determines whether a movement operation for the tracking start position has been performed. If it is determined that the movement operation has been performed (YES in step S1002), the system control unit 50 advances the processing to step S1003, and, if it is determined that the movement operation has not been performed (NO in step S1002), the system control unit 50 advances the processing to step S1004. Examples of the movement operation in the present exemplary embodiment include a frame movement performed with use of 8-way keys or arrow buttons and a frame movement performed by a touch.

In step S1003, the system control unit 50 updates the tracking start position based on the movement operation for the tracking start position (for example, from the state 8-D to the state 8-E).

In step S1004, the system control unit 50 determines whether a tracking start operation has been performed. If it is determined that the tracking start operation has been performed (YES in step S1004), the system control unit 50 advances the processing to step S1005, and, if it is determined that the tracking start operation has not been performed (NO in step S1004), the system control unit 50 advances the processing to step S1006. Examples of the tracking start operation in the present exemplary embodiment include "starting of tracking" in the button customization function.

In step S1005, the system control unit 50 detects subjects from the tracking start position, determines a main subject, and starts tracking of the main subject. At the start of tracking, the tracking start position (AF area frame) becomes hidden and the tracking frame is displayed (for example, from the state 8-E to the state 8-F).

In step S1006, the system control unit 50 determines whether tracking is being continued. If it is determined that tracking is being continued (YES in step S1006), the system control unit 50 advances the processing to step S1007, and, if it is determined that tracking is not being continued (NO in step S1006), the system control unit 50 advances the processing to step S1008.

In step S1007, the system control unit 50 performs updating of the tracking frame. The system control unit 50 updates the tracking frame in conformity with motion of the subject (for example, from the state 8-B to the state 8-C).

In step S1008, the system control unit 50 determines whether a tracking stopping operation has been performed. If it is determined that the tracking stopping operation has been performed (YES in step S1008), the system control unit 50 advances the processing to step S1009, and, if it is determined that the tracking stopping operation has not been performed (NO in step S1008), the system control unit 50 advances the processing to step S1010.

In step S1009, the system control unit 50 stops tracking. At this time, the system control unit 50 hides the tracking frame and displays the tracking start position (AF area frame). At this time, the system control unit 50 reads out the stored tracking start position and sets the tracking start position (for example, from the state 8-C to the state 8-D).

In step S1010, the system control unit 50 determines whether an image capturing preparation operation has been performed. If it is determined that the image capturing preparation operation has been performed (YES in step S1010), the system control unit 50 advances the processing to step S1011, and, if it is determined that the image capturing preparation operation has not been performed (NO in step S1010), the system control unit 50 advances the processing to step S1036. Examples of the image capturing preparation operation in the present exemplary embodiment include operations for the first shutter switch signal SW1 and the second shutter switch signal SW2 (for example, from the state 8-A to the state 8-J).

In step S1011, the system control unit 50 turns off a position change flag and an automatic tracking flag, which are controlled in the present flow.

In step S1012, the system control unit 50 temporarily stores the tracking start position in the memory. In the present flow, the tracking start position is defined as a start position temporary.

In step S1013, the system control unit 50 determines whether to trigger starting of tracking by tracking setting (automatic tracking). The condition for such determination includes transitioning from the image capturing standby state to the image capturing preparation state with tracking setting set to "do" in a state in which tracking is not being performed. If it is determined to trigger automatic tracking (YES in step S1013), the system control unit 50 advances the processing to step S1014, and, if it is determined not to trigger automatic tracking (NO in step S1013), the system control unit 50 advances the processing to step S1016.

In step S1014, the system control unit 50 detects subjects from the tracking start position, determines a main subject, and starts tracking of the main subject. At the start of tracking, the tracking start position (AF area frame) becomes hidden and the tracking frame is displayed (for example, from the state 8-A to the state 8-G).

In step S1015, the system control unit 50 turns on the automatic tracking flag.

In step S1016, the system control unit 50 determines whether a movement operation for the tracking start position has been performed. If it is determined that the movement operation has been performed (YES in step S1016), the system control unit 50 advances the processing to step S1017, and, if it is determined that the movement operation has not been performed (NO in step S1016), the system control unit 50 advances the processing to step S1019. Examples of the movement operation in the present exemplary embodiment include a frame movement performed with use of 8-way keys or arrow buttons and a frame movement performed by a touch.

In step S1017, the system control unit 50 updates the tracking start position based on the movement operation for the tracking start position (for example, from the state 8-I to the state 8-J).

In step S1018, the system control unit 50 turns on the position change flag.

In step S1019, the system control unit 50 determines whether the tracking start operation has been performed. If it is determined that the tracking start operation has been performed (YES in step S1019), the system control unit 50 advances the processing to step S1020, and, if it is determined that the tracking start operation has not been performed (NO in step S1019), the system control unit 50 advances the processing to step S1021. Examples of the tracking start operation in the present exemplary embodiment include "starting of tracking" in the button customization function.

In step S1020, the system control unit 50 detects subjects from the tracking start position, determines a main subject, and starts tracking of the main subject. At the start of tracking, the tracking start position (AF area frame) becomes hidden and the tracking frame is displayed (for example, from the state 8-J to the state 8-K).

In step S1021, the system control unit 50 determines whether tracking is being continued. If it is determined that tracking is being continued (YES in step S1021), the system control unit 50 advances the processing to step S1022, and, if it is determined that tracking is not being continued (NO in step S1021), the system control unit 50 advances the processing to step S1023.

In step S1022, the system control unit 50 performs updating of the tracking frame. The system control unit 50 updates the tracking frame in conformity with motion of the subject (for example, from the state 8-G to the state 8-H).

In step S1023, the system control unit 50 determines whether the tracking stopping operation has been performed. If it is determined that the tracking stopping operation has been performed (YES in step S1023), the system control unit 50 advances the processing to step S1024, and, if it is determined that the tracking stopping operation has not been performed (NO in step S1023), the system control unit 50 advances the processing to step S1027.

In step S1024, the system control unit 50 sets the center position of the tracking frame which is being tracked as the tracking start position. This processing is characteristic in the present exemplary embodiment, and, since, in the case of the image capturing preparation state, importance is attached to the continuity of tracking, the system control unit 50 performs such processing.

In step S1025, the system control unit 50 stops tracking. At this time, the system control unit 50 hides the tracking frame and displays the tracking start position (AF area frame) at the position set in step S1024 (for example, from the state 8-H to the state 8-I).

In step S1026, the system control unit 50 turns off the automatic tracking flag. Furthermore, as a second exemplary embodiment, an easily understandable configuration in which processing in step S1026 is not performed and tracking in step S1014 is made clear can be employed to change control.

In step S1027, the system control unit 50 determines whether to perform an AF operation. If it is determined to perform the AF operation (YES in step S1027), the system control unit 50 advances the processing to step S1028, and, if it is determined not to perform the AF operation (NO in step S1027), the system control unit 50 advances the processing to step S1029.

In step S1028, the system control unit 50 performs the AF operation. Examples of the AF operation in the present exemplary embodiment include a servo operation. If the AF operation is a servo operation, the system control unit 50 performs the servo operation each time for focus tracking.

In step S1029, the system control unit 50 determines whether an instruction for the image capturing operation has been issued. If it is determined that an instruction for the image capturing operation has been issued (YES in step S1029), the system control unit 50 advances the processing to step S1030, and, if it is determined that an instruction for the image capturing operation has not been issued (NO in step S1029), the system control unit 50 advances the processing to step S1031.

In step S1030, the system control unit 50 performs image capturing. The image capturing in the present exemplary embodiment includes performing image capturing in response to the second shutter switch signal SW2 (for example, from the state 8-G to the state 8-L).

In step S1031, the system control unit 50 determines whether the image capturing preparation state has been canceled. If it is determined that the image capturing preparation state has been canceled (YES in step S1031), the system control unit 50 advances the processing to step S1032, and, if it is determined that the image capturing preparation state has not been canceled (NO in step S1031), the system control unit 50 returns the processing to step S1016.

In step S1032, the system control unit 50 determines the state of the automatic tracking flag. If it is determined that the automatic tracking flag is ON (YES in step S1032), the system control unit 50 advances the processing to step S1033, and, if it is determined that the automatic tracking flag is OFF (NO in step S1032), the system control unit 50 advances the processing to step S1034.

In step S1033, the system control unit 50 stops tracking. At this time, the system control unit 50 hides the tracking frame and displays the tracking start position (AF area frame) at the position set in step S1024 (for example, from the state 8-G to the state 8-A).

In step S1034, the system control unit 50 determines the state of the position change flag. If it is determined that the position change flag is ON (YES in step S1034), the system control unit 50 advances the processing to step S1036, and, if it is determined that the position change flag is OFF (NO in step S1034), the system control unit 50 advances the processing to step S1035.

In step S1035, the system control unit 50 sets the tracking start position to the start position temporary (for example, from the state 8-I to the state 8-D). In step S1036, the system control unit 50 determines whether to end the present flow. If it is determined to end the present flow (YES in step S1036), the system control unit 50 advances the processing to step S1037, and, if it is determined not to end the present flow (NO in step S1036), the system control unit 50 returns the processing to step S1002.

In step S1037, the system control unit 50 stores the tracking start position in the storage region (memory) and then ends the processing.

<Control Flow in the Case of One-Shot AF>

Figure 11:
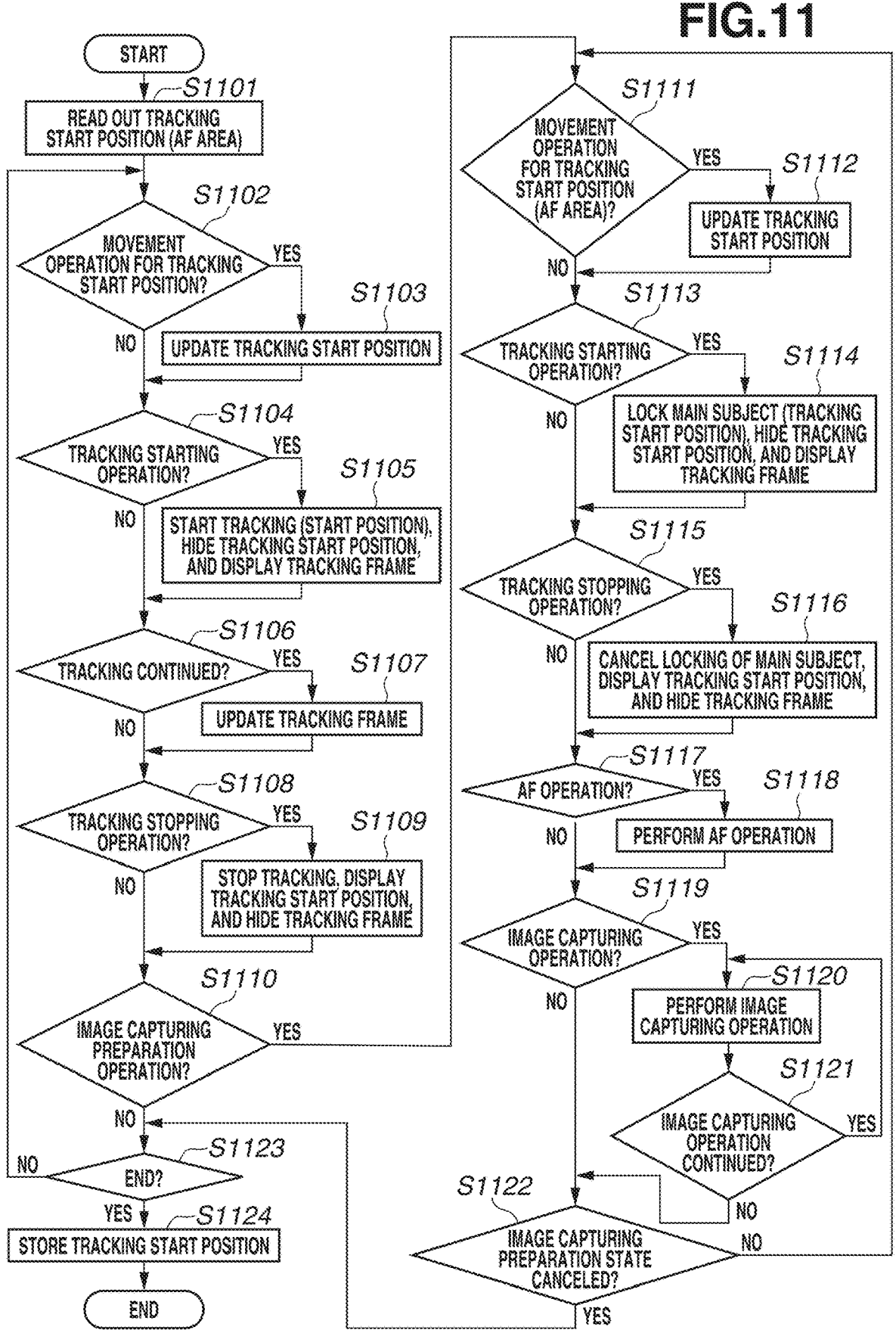
FIG. 11 is a flowchart illustrating control which is performed in the case of one-shot AF.

FIG. 11 is a flowchart illustrating control which is performed in the case of one-shot AF. Each processing operation is implemented by the system control unit 50 loading a program stored in the non-volatile memory 56 onto the system memory 52 and executing the program.

In the following flowchart, processing or control is performed by the system control unit 50.

In step S1101, the system control unit 50 reads out a tracking start position (AF area) from a storage region (memory).

In step S1102, the system control unit 50 determines whether a movement operation for the tracking start position has been performed. If it is determined that the movement operation has been performed (YES in step S1102), the system control unit 50 advances the processing to step S1103, and, if it is determined that the movement operation has not been performed (NO in step S1102), the system control unit 50 advances the processing to step S1104. Examples of the movement operation in the present exemplary embodiment include a frame movement performed with use of 8-way keys or arrow buttons and a frame movement performed by a touch.

In step S1103, the system control unit 50 updates the tracking start position based on the movement operation for the tracking start position.

In step S1104, the system control unit 50 determines whether a tracking start operation has been performed. If it is determined that the tracking start operation has been performed (YES in step S1104), the system control unit 50 advances the processing to step S1105, and, if it is determined that the tracking start operation has not been performed (NO in step S1104), the system control unit 50 advances the processing to step S1106. Examples of the tracking start operation in the present exemplary embodiment include "starting of tracking" in the button customization function.

In step S1105, the system control unit 50 detects subjects from the tracking start position, determines a main subject, and starts tracking of the main subject. At the start of tracking, the tracking start position (AF area frame) becomes hidden and the tracking frame is displayed (for example, from the state 9-D to the state 9-E or the state 9-*a* to the state 9-*b*).

In step S1106, the system control unit 50 determines whether tracking is being continued. If it is determined that tracking is being continued (YES in step S1106), the system control unit 50 advances the processing to step S1107, and, if it is determined that tracking is not being continued (NO in step S1106), the system control unit 50 advances the processing to step S1108.

In step S1107, the system control unit 50 performs updating of the tracking frame. The system control unit 50 updates the tracking frame in conformity with motion of the subject (for example, from the state 9-B to the state 9-C).

In step S1108, the system control unit 50 determines whether a tracking stopping operation has been performed. If it is determined that the tracking stopping operation has been performed (YES in step S1108), the system control unit 50 advances the processing to step S1109, and, if it is determined that the tracking stopping operation has not been performed (NO in step S1108), the system control unit 50 advances the processing to step S1110.

In step S1109, the system control unit 50 stops tracking. At this time, the system control unit 50 hides the tracking frame and displays the tracking start position (AF area frame). At this time, the system control unit 50 reads out the stored tracking start position and sets the tracking start position (for example, from the state 9-C to the state 9-D).

In step S1110, the system control unit 50 determines whether an image capturing preparation operation has been performed. If it is determined that the image capturing preparation operation has been performed (YES in step S1110), the system control unit 50 advances the processing to step S1111, and, if it is determined that the image capturing preparation operation has not been performed (NO in step S1110), the system control unit 50 advances the processing to step S1123. Examples of the image capturing preparation operation in the present exemplary embodiment include operations for the first shutter switch signal SW1 and the second shutter switch signal SW2 (for example, from the state 9-A to the state 9-F).

In step S1111, the system control unit 50 determines whether a movement operation for the tracking start position has been performed. If it is determined that the movement operation has been performed (YES in step S1111), the system control unit 50 advances the processing to step S1112, and, if it is determined that the movement operation has not been performed (NO in step S1111), the system control unit 50 advances the processing to step S1113. Examples of the movement operation in the present exemplary embodiment include a position movement performed by a center return operation. Furthermore, as another exemplary embodiment, the position movement can be performed by, for example, an operation member for eight directions.

In step S1112, the system control unit 50 updates the tracking start position based on the movement operation for the tracking start position.

In step S1113, the system control unit 50 determines whether the tracking start operation has been performed. If it is determined that the tracking start operation has been performed (YES in step S1113), the system control unit 50 advances the processing to step S1114, and, if it is determined that the tracking start operation has not been performed (NO in step S113), the system control unit 50 advances the processing to step S1115. Examples of the tracking start operation in the present exemplary embodiment include "starting of tracking" in the button customization function.

In step S1114, the system control unit 50 detects subjects from the tracking start position, and locks a main subject. At the time of locking the main subject, the tracking start position (AF area frame) becomes hidden and the tracking frame is displayed (for example, from the state 9-*f* to the state 9-*g*).

In step S1115, the system control unit 50 determines whether the tracking stopping operation has been performed. If it is determined that the tracking stopping operation has been performed (YES in step S1115), the system control unit 50 advances the processing to step S1116, and, if it is determined that the tracking stopping operation has not been performed (NO in step S1115), the system control unit 50 advances the processing to step S1117.

In step S1116, the system control unit 50 cancels locking of the main subject. Furthermore, at the time of cancellation, the system control unit 50 also turns off an internal tracking state (for example, from the state 9-*g* to the state 9-*f*).

In step S1117, the system control unit 50 determines whether to perform an AF operation. If it is determined to perform the AF operation (YES in step S1117), the system control unit 50 advances the processing to step S1118, and, if it is determined not to perform the AF operation (NO in step S1117), the system control unit 50 advances the processing to step S1119.

In step S118, the system control unit 50 performs the AF operation. Examples of the AF operation in the present exemplary embodiment include a one-shot operation. If the AF operation is a one-shot operation, the system control unit 50 once performs the one-shot operation in the image capturing preparation state, and, after an in-focus state is achieved, the control unit 50 locks a focus position (for example, from the state 9-*a* to the state 9-*f*).

In step S119, the system control unit 50 determines whether an instruction for the image capturing operation has been issued. If it is determined that an instruction for the image capturing operation has been issued (YES in step S1119), the system control unit 50 advances the processing to step S1120, and, if it is determined that an instruction for the image capturing operation has not been issued (NO in step S119), the system control unit 50 advances the processing to step S1122.

In step S1120, the system control unit 50 performs image capturing operation. The image capturing in the present exemplary embodiment includes performing image capturing in response to the second shutter switch signal SW2 (for example, from the state 9-F to the state 9-K).

In step S1121, the system control unit 50 determines whether the image capturing operation is continued. If it is determined that the image capturing operation is continued (YES in step S1121), the system control unit 50 returns the processing to step S1120, and, if it is determined that the image capturing operation is not continued (NO in step S1121), the system control unit 50 advances the processing to step S1122. During a period in which, with continuous shooting set, the second shutter switch signal SW2 is kept output, in the case of one-shot AF, the system control unit 50 repeats image capturing while fixing a focus position.

In step S1122, the system control unit 50 determines whether the image capturing preparation state has been canceled. If it is determined that the image capturing preparation state has been canceled (YES in step S1122), the system control unit 50 advances the processing to step S1123, and, if it is determined that the image capturing preparation state has not been canceled (NO in step S1122), the system control unit 50 returns the processing to step S1111.

In step S1123, the system control unit 50 determines whether to end the present flow. If it is determined to end the present flow (YES in step S1123), the system control unit 50 advances the processing to step S1124, and, if it is determined not to end the present flow (NO in step S1123), the system control unit 50 returns the processing to step S1102.

In step S1124, the system control unit 50 stores the tracking start position in the storage region (memory) and then ends the processing.

As described above, during a period in which, at the time of stopping of tracking, the image capturing preparation state is continued, the system control unit 50 prioritizes continuity of tracking and does not return to the original tracking start position, and stops tracking with the vicinity of a subject targeted for tracking (a position which has been targeted for tracking until just before) set as a tracking start position. Moreover, in the case of the image capturing standby state, the system control unit 50 returns the tracking start position to the original position. This enables setting an optimum tracking start position. This implements a comfortable operability. Particularly, this is effective as a method for determining a target for image capturing by a digital camera, and enables performing comfortable image capturing without missing a photo opportunity.

Furthermore, while, in the present exemplary embodiment, an example in which a display frame serving as an index for indicating a position or size on the screen is expressed by a rectangle has been described, the index does not necessarily need to be a rectangle, but can be an optional shape such as a circle or hexagon. Moreover, the index can be an indication such as a sight being cross-shaped arrows indicating only a position.

Moreover, the system control unit 50 is capable of generating metadata based on an image capturing condition obtained by a combination of image capturing setting and detection setting, appending the metadata to image data captured by the imaging unit 22, and recording the image data with the metadata appended thereto on the recording medium 200. When displaying a recorded image, the system control unit 50 can be configured to display metadata recorded in association with image data. For example, image data and metadata for recording are recorded according to a standard such as Exchangeable image file format (Exif).

Moreover, while only an example in which stopping of tracking is performed by the "tracking stopping" operation performed by the user has been described, a configuration in which the system control unit 50 automatically performs stopping of tracking when a tracking target has been lost, when the degree of reliability of tracking has become less than a predetermined value, or when the tracking target has been switched to another tracking target can be employed.

Furthermore, the above-described various control operations, which have been described as being performed by the system control unit 50, can be performed by one piece of hardware or can be performed by a plurality of pieces of hardware sharing processing operations to control the entire apparatus.

Moreover, while the present disclosure has been described in detail based on exemplary embodiments thereof, the present disclosure is not limited to such specific exemplary embodiments, and various configurations which are included in a range not departing from the gist of the present disclosure are also included in the present disclosure. Additionally, the above-described exemplary embodiments represent only examples of implementation of the present disclosure, and some or all of the above-described exemplary embodiments can be combined as appropriate.

Moreover, while, in the above-described exemplary embodiments, an example in which the present disclosure is applied to the digital camera 100 has been described, the present disclosure is not limited to this example, but can also be applied to a display control apparatus capable of performing control concerning image processing. Thus, the present disclosure can be applied to, for example, a mobile telephone terminal, a portable image viewer, a personal computer (PC), a printer apparatus equipped with a viewfinder, home electrical appliance equipped with a display unit, a digital photo frame, a projector, a tablet PC, a music player, a gaming machine, and a digital book reader.

According to aspects of the present disclosure, it is possible to set an optimum tracking start position.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s)

and/or that includes one or more circuits (e.g., application specific integrated circuit (ASTC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-098471 filed Jun. 14, 2021, which is hereby incorporated by reference herein in its entirety.

What is claimed is:

1. An electronic apparatus comprising:
a memory storing instructions; and
at least one processor executing the instructions causing the electronic apparatus to:
track a tracking target included in an image;
move a tracking start position in a captured image;
start tracking from the tracking start position;
stop tracking; and
control first processing for, at the stopping of tracking, setting the tracking start position to a position at which the tracking target has been tracked until immediately before the stopping of tracking and second processing for, at the stopping of tracking, setting the tracking start position to a previously determined tracking start position,
wherein the first processing is selected when a current state is a state in which an image capturing preparation instruction for starting image capturing preparation has been issued at the stopping of tracking and the second processing is selected when the current state is a state in which the image capturing preparation instruction for starting image capturing preparation has not been issued at the stopping of tracking.

2. The electronic apparatus according to claim 1, wherein stopping of tracking is performed according to a user operation.

3. The electronic apparatus according to claim 1, wherein stopping of tracking is automatically performed in a case where the tracking target has been lost, in a case where a reliability of tracking has become less than a predetermined value, or in a case where the tracking target has been switched to another tracking target.

4. The electronic apparatus according to claim 1, wherein the state in which an image capturing preparation instruction has been issued is a state in which a shutter button has been half-pressed.

5. The electronic apparatus according to claim 1, wherein the at least one processor executing the instructions causing the electronic apparatus to perform continuous autofocus with respect to a subject targeted for tracking when the electronic apparatus is in a state in which the image capturing preparation instruction is being kept.

6. The electronic apparatus according to claim 1, wherein the image is a live view image which is being captured by an image capturing unit.

7. The electronic apparatus according to claim 6, wherein the electronic apparatus further comprises the image capturing unit.

8. A control method for an electronic apparatus, the control method comprising:
tracking a tracking target included in an image;
moving a tracking start position in a captured image;
starting tracking of the tracking target from the tracking start position;
stopping tracking of the tracking target;
controlling first processing for, at the stopping of tracking, setting the tracking start position to a position at which the tracking target has been tracked until immediately before the stopping of tracking and second processing for, at the stopping of tracking, setting the tracking start position to a previously determined tracking start position; and
selecting the first processing when a current state is a state in which an image capturing preparation instruction for starting image capturing preparation has been issued at the stopping of tracking and selecting the second processing when the current state is a state in which the image capturing preparation instruction for starting image capturing preparation has not been issued at the stopping of tracking.

9. A non-transitory computer-readable storage medium storing a program that causes, when executed by a computer of a focus detection device, the computer to function as:
a tracking unit configured to track a tracking target included in an image;
a movement unit configured to move a tracking start position in a captured image;
a tracking starting unit configured to start tracking by the tracking unit from the tracking start position;
a tracking stopping unit configured to stop tracking performed by the tracking unit; and
a control unit configured to control first processing for, at the stopping of tracking, setting the tracking start position to a position at which the tracking target has been tracked until immediately before the stopping of tracking and second processing for, at the stopping of tracking, setting the tracking start position to a previously determined tracking start position,
wherein the control unit selects the first processing when a current state is a state in which an image capturing preparation instruction for starting image capturing preparation has been issued at the stopping of tracking and the second processing is selected when the current state is a state in which the image capturing preparation instruction for starting image capturing preparation has not been issued at the stopping of tracking.

* * * * *